(12) United States Patent
Wu et al.

(10) Patent No.: US 11,939,942 B2
(45) Date of Patent: Mar. 26, 2024

(54) REMOTE CONTROLLER, REMOTE-CONTROL SYSTEM AND CONTROL METHOD THEREOF

(71) Applicant: WISTRON NEWEB CORPORATION, Hsinchu (TW)

(72) Inventors: Chia-Hsin Wu, Hsinchu (TW); Chui-Sung Peng, Hsinchu (TW); Chu-Chi Sun, Hsinchu (TW); Fu-Ming Kang, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 0 days.

(21) Appl. No.: 17/868,957

(22) Filed: Jul. 20, 2022

(65) Prior Publication Data
US 2023/0193869 A1 Jun. 22, 2023

(30) Foreign Application Priority Data

Dec. 17, 2021 (TW) ................. 110147553

(51) Int. Cl.
| F02N 11/08 | (2006.01) |
| G05D 1/00 | (2006.01) |
| G08C 17/02 | (2006.01) |
| H04B 17/318 | (2015.01) |
| H04W 4/80 | (2018.01) |

(52) U.S. Cl.
CPC ....... F02N 11/0807 (2013.01); G05D 1/0016 (2013.01); G05D 1/0022 (2013.01); G08C 17/02 (2013.01); H04B 17/318 (2015.01); H04W 4/80 (2018.02); G08C 2201/12 (2013.01); G08C 2201/91 (2013.01)

(58) Field of Classification Search
CPC .................. F02N 11/0807; H04B 17/318
See application file for complete search history.

(56) References Cited

U.S. PATENT DOCUMENTS

| 2017/0223807 A1* | 8/2017 | Recker ............... H02J 7/34 |
| 2023/0193869 A1* | 6/2023 | Wu ............... H04B 17/27 |
| | | 701/107 |

FOREIGN PATENT DOCUMENTS

| CN | 109760629 A | 5/2019 |
| CN | 110276941 A | 9/2019 |

* cited by examiner

Primary Examiner — John Kwon
(74) Attorney, Agent, or Firm — McClure, Qualey & Rodack, LLP

(57) ABSTRACT

A remote controller, a remote-control system and a control method thereof are provided. The remote controller includes a motion sensing circuit and a wireless communication circuit electrically connected to the motion sensing circuit. The motion sensing circuit determines whether or not a motion of the remote controller complies with one of multiple reference motions. When the motion of the remote controller complies with one of the reference motions, the wireless communication circuit is switched from a sleep state to a working state. The wireless communication circuit that is in the working state determines whether or not a received signal strength indication between the remote controller and a controlled device is greater than or equal to a strength threshold. When the received signal strength indication is less than the strength threshold, the wireless communication circuit is switched from the working state to the sleep state.

11 Claims, 23 Drawing Sheets

REMOTE CONTROLLER, REMOTE-CONTROL SYSTEM AND CONTROL METHOD THEREOF

CROSS-REFERENCE TO RELATED PATENT APPLICATION

This application claims the benefit of priority to Taiwan Patent Application No. 110147553, filed on Dec. 17, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a remote controller, a remote-control system and a control method thereof.

BACKGROUND OF THE DISCLOSURE

In recent years, many consumer electronics support wireless communication technologies, such as radio-frequency identification (RFID). The consumer electronic or a vehicle is equipped with a radio wave transceiver and a memory. The memory saves identification information. A remote controller is also equipped with another radio wave transceiver. The radio wave transceiver of the remote controller sends a radio wave to the radio wave transceiver of the consumer electronic. After the consumer electronic authenticates an identity of the remote controller, the remote controller can control the consumer electronic.

When the remote controller is not being used, the radio wave transceiver continues to consume power of a battery of the remote controller. As such, a consumer needs to pay attention to the remaining power of the battery of the remote controller and charge the battery. Otherwise, when the power of the battery is insufficient, the radio wave transceiver cannot be activated, thereby causing the remote controller to be unusable.

Therefore, how to overcome the above-mentioned deficiency has become one of the important issues to be solved in the field.

SUMMARY OF THE DISCLOSURE

In response to the above-referenced technical inadequacy, the present disclosure provides a remote controller, a remote-control system and a control method thereof.

In one aspect, the present disclosure provides a remote controller. The remote controller includes a motion sensing circuit and a wireless communication circuit. The motion sensing circuit determines whether or not a motion of the remote controller complies with one of a plurality of reference motions. The wireless communication circuit is electrically connected to the motion sensing circuit. When the motion of the remote controller complies with one of the plurality of reference motions, the wireless communication circuit is switched from a sleep state to a working state. The wireless communication circuit that is in the working state determines whether or not a received signal strength indication (RSSI) between the remote controller and a controlled device is greater than or equal to a strength threshold. When the received signal strength indication is less than the strength threshold, the wireless communication circuit is switched from the working state to the sleep state.

In another aspect, the present disclosure provides a remote-control system. The remote-control system includes a remote controller and a second wireless communication circuit. The remote controller includes a motion sensing circuit and a first wireless communication circuit electrically connected to the motion sensing circuit. The motion sensing circuit determines whether or not a motion of the remote controller complies with one of a plurality of reference motions. The second wireless communication circuit is configured to be disposed in a controlled device. When the motion of the remote controller complies with one of the plurality of reference motions, the first wireless communication circuit is switched from a sleep state to a working state. The first wireless communication circuit or the second wireless communication circuit determines whether or not a received signal strength indication between the remote controller and the controlled device is greater than a strength threshold. When the received signal strength indication is greater or equal to the strength threshold, the second wireless communication circuit detects an operational state of the controlled device and sends a control command to the controlled device according to the operational state and the motion of the remote controller.

In yet another aspect, the present disclosure provides a control method of a remote-control system. The control method includes: determining, by a motion sensing circuit of a remote controller, whether or not a motion of the remote controller complies with one of a plurality of reference motions; switching a first wireless communication circuit of the remote controller from a sleep state to a working state when the motion of the remote controller complies with one of the plurality of reference motions; determining, by the first wireless communication circuit in the working state or a second wireless communication circuit of a controlled device, whether or not a received signal strength indication between the remote controller and the controlled device is greater than or equal to a strength threshold; communicatively connecting the second wireless communication circuit with the first wireless communication circuit when the received signal strength indication is greater than or equal to the strength threshold; detecting, by the second wireless communication circuit, an operational state of the controlled device; and sending, by the second wireless communication circuit, a control command to the controlled device according to the operational state of the controlled device and the motion of the remote controller.

Therefore, the remote controller, the remote-control system and the control method of the remote-control system provided by the present disclosure can be applied to various consumer electronics and vehicles. The wireless communication circuit is initially in the sleep state, and a user applies an external force to the remote controller, so as to generate a motion of the remote controller. Only when the motion of the remote controller complies with at least one of the multiple reference motions does the motion sensing circuit switch the wireless communication circuit from the sleep state to the working state. As such, the user must apply a correct external force to the remote controller, so that the wireless communication circuit can be switched from the sleep state to the working state. In this way, power of the remote controller can be saved.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
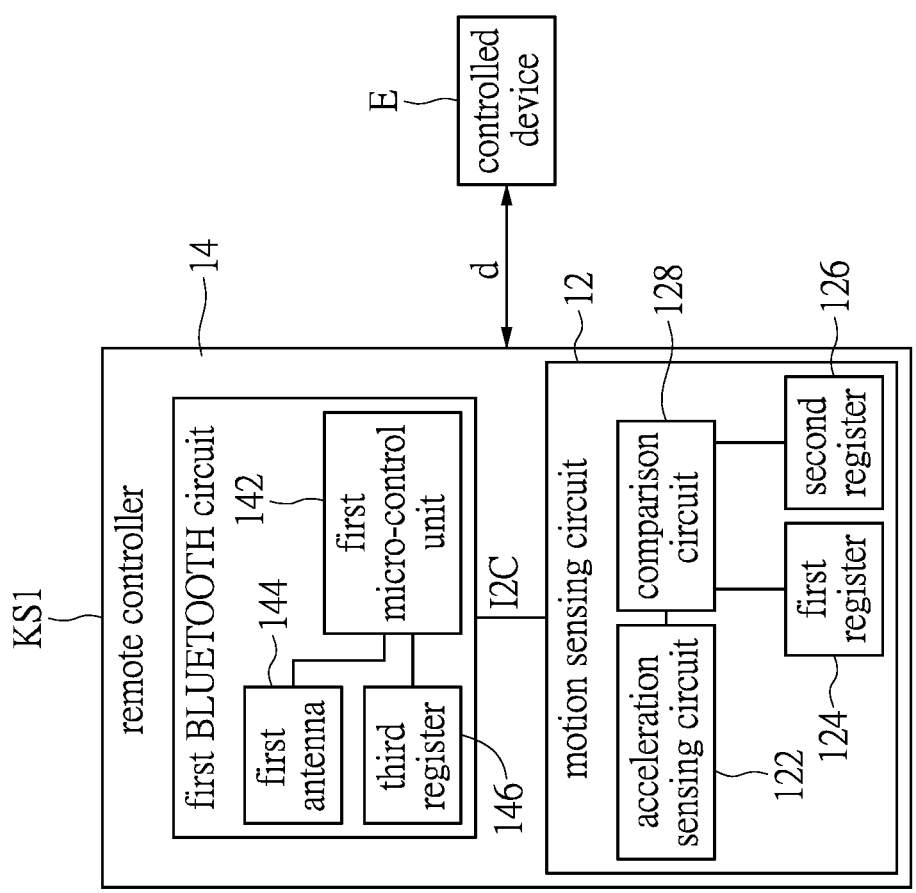
FIG. 1 is a circuit block diagram of a remote controller according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

FIG. 1 is a circuit block diagram of a remote controller according to a first embodiment of the present disclosure. As shown in FIG. 1, a remote controller KS1 includes a motion sensing circuit 12 and a first BLUETOOTH circuit 14. For example, the first BLUETOOTH circuit 14 may be a BLUETOOTH low energy (BLE) circuit. The first BLUETOOTH circuit 14 is in a sleep state, and the motion sensing circuit 12 is electrically connected to the first BLUETOOTH circuit 14 by an inter-integrated circuit.

The motion sensing circuit 12 includes an acceleration sensing circuit 122, a first register 124, a second register 126 and a comparison circuit 128, and each of the acceleration sensing circuit 122, the first register 124, and the second register 126 is electrically connected to the comparison circuit 128. When the remote controller KS1 receives an external force of a user and a motion of the remote controller KS1 is generated, the acceleration sensing circuit 122 detects an X-axis acceleration change, a Y-axis acceleration change, and a Z-axis acceleration change of the motion of the remote controller KS1. The motion of the remote controller KS1 caused by the external force can be, for example, a displacement or a rotation of the remote controller KS1. The first register 124 saves a plurality of different reference motions, and these reference motions can be preset and changed according to a requirement of the user. Each of the plurality of reference motions includes a specific X-axis reference acceleration change, a specific Y-axis reference acceleration change, and a specific Z-axis reference acceleration change, and the plurality of reference motions are preset to correspond to different motion index values. For example, two of the reference motions are a clockwise rotation and a counterclockwise rotation, respectively. Naturally, acceleration changes of the clockwise rotation along an X axis, a Y axis and a Z axis are not the same as acceleration changes of the counterclockwise rotation along the X axis, the Y axis and the Z axis. The motion index value corresponding to the clockwise rotation is 0, and the motion index value corresponding to the counterclockwise rotation is 1.

After the acceleration sensing circuit 122 detects the X-axis acceleration change, the Y-axis acceleration change and the Z-axis acceleration change of the motion of the remote controller KS1, the comparison circuit 128 compares the X-axis acceleration change, the Y-axis acceleration change and the Z-axis acceleration change with the reference motions saved in the first register 124. When the comparison circuit 128 determines that the X-axis acceleration change, the Y-axis acceleration change and the Z-axis acceleration change of the motion of the remote controller KS1 comply with the X-axis reference acceleration change, the Y-axis reference acceleration change and the Z-axis reference acceleration change of one of the reference motions, the motion of the remote controller KS1 complies with the one of the reference motions. When the motion of the remote controller KS1 complies with the one of the reference motions, the comparison circuit 128 saves the motion index value which corresponds to the motion of the remote controller KS1 in the second register 126. For example, a first reference motion and a second reference motion of the first register 124 respectively correspond to a first motion index value and a second motion index value. When the motion of the remote controller KS1 complies with the first reference motion, the motion of the remote controller KS1 corresponds to the first motion index value. When the motion of the remote controller KS1 complies with the second reference motion, the motion of the remote controller KS1 corresponds to the second motion index value.

When the motion of the remote controller KS1 complies with one of the plurality of reference motions, the comparison circuit 128 further sends an interrupt signal to the first BLUETOOTH circuit 14 by the inter-integrated circuit bus. The first BLUETOOTH circuit 14 is switched from the sleep state to a working state due to the interrupt signal, and the working state includes a startup state.

The first BLUETOOTH circuit 14 includes a first micro-control unit 142, a first antenna 144 and a third register 146, and each of the first antenna 144 and the third register 146 is electrically connected to the first micro-control unit 142. When the first BLUETOOTH circuit 14 is in the working state, the first micro-control unit 142 of the first BLUETOOTH circuit 14 obtains the motion index value from the second register 126 of the motion sensing circuit 12 via the inter-integrated circuit bus, and saves the motion index value in the third register 146. The first BLUETOOTH circuit 14 that is in the working state sends a beacon to a controlled device E, and then the first BLUETOOTH circuit 14 in the working state determines whether or not a received signal strength indication (RSSI) between the remote controller KS1 and the controlled device E is greater than or equal to a strength threshold. The strength threshold can be, for example, −55 dB, but is not limited thereto. When the received signal strength indication is greater than or equal to the strength threshold, the first micro-control unit 142 of the first BLUETOOTH circuit 14 transmits the motion index value saved in the third register 146 to the controlled device E. Or, when the received signal strength indication is greater than or equal to the strength threshold and the remote controller KS1 is in communication with the controlled device E, the first micro-control unit 142 of the first BLUETOOTH circuit 14 transmits the motion index value saved in the third register 146 to the controlled device E. When the controlled device E receives the motion index value, the controlled device E notifies the remote controller KS1 to be switched from the working state to the sleep state. When the received signal strength indication is less than the strength threshold, the first BLUETOOTH circuit 14 is switched from the working state to the sleep state. Generally speaking, the closer a distance (d) between the remote controller KS1 and the controlled device E is, the stronger the received signal strength indication is. On the contrary, the farther the distance (d) between the remote controller KS1 and the controlled device E is, the weaker the received signal strength indication is. Therefore, the user can set a safe distance between the remote controller KS1 and the controlled device E by adjusting the strength threshold.

In addition, the first BLUETOOTH circuit 14 mentioned above is only an example. In fact, the first BLUETOOTH circuit 14 (of low energy consumption) in the remote controller KS1 can be replaced by other types of wireless communication circuits, such as RFID (NFC/LF/HF), WI-FI, or Zigbee (wireless communication protocols with RSSI information).

Figure 2:
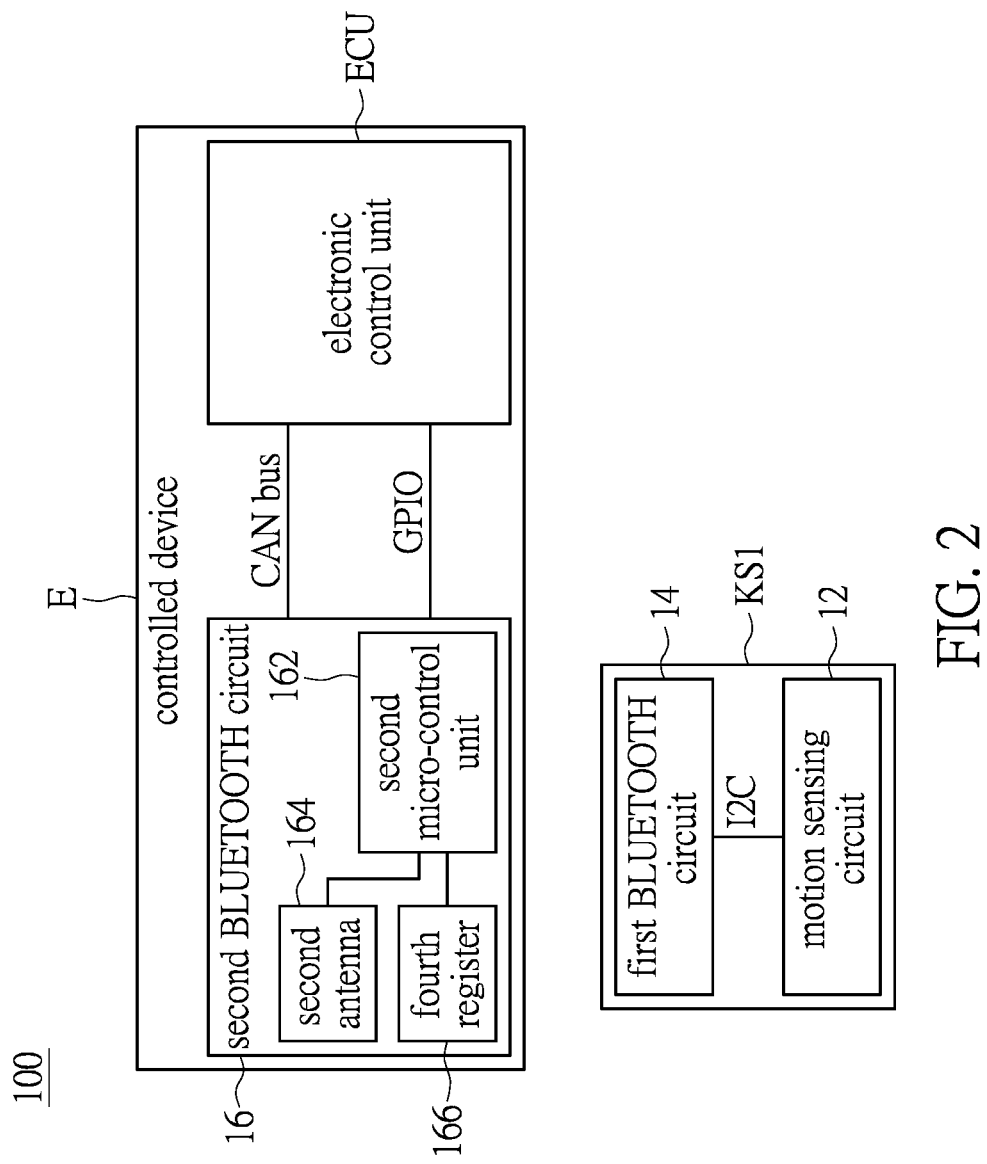
FIG. 2 is a circuit block diagram of a remote-control system according to the first embodiment of the present disclosure.

FIG. 2 is a circuit block diagram of a remote-control system according to a first embodiment of the present disclosure. As shown in FIG. 2, a remote-control system 100 includes the remote controller KS1 of FIG. 1 and a second BLUETOOTH circuit 16. For example, the second BLUETOOTH circuit 16 may be a BLUETOOTH low energy circuit. The second BLUETOOTH circuit 16 includes a second micro-control unit 162, a second antenna 164 and a fourth register 166, and each of the second antenna 164 and the fourth register 166 is electrically connected to the second micro-control unit 162. The first BLUETOOTH circuit 14 is disposed in the remote controller KS1, and the second BLUETOOTH circuit 16 is disposed in the controlled device E. In addition, the second BLUETOOTH circuit 16 is always in the startup state by receiving power from a battery of the controlled device E. The type of the controlled device E is not limited, such as a motorbike, a bicycle, a car or a multimedia audio-visual device.

The controlled device E includes a general-purpose input/output (GPIO), a controller area network (CAN bus), and an electronic control unit (ECU). The second micro-control unit 162 of the second BLUETOOTH circuit 16 is electrically connected to the general-purpose input/output (GPIO) and the controller area network (CAN bus), and is electrically connected to the electronic control unit (ECU) through the general input/output (GPIO) and the controller area network (CAN bus).

When the acceleration sensing circuit 122 of the motion sensing circuit 12 detects the motion of the remote controller KS1 caused by the external force and the comparison circuit 128 determines that the motion of the remote controller KS1 complies with one of the plurality of reference motions saved in the first register 124, the comparison circuit 128 saves the motion index value corresponding to the motion of the remote controller KS1 in the second register 126 and transmits the interrupt signal to the first BLUETOOTH circuit 14. Accordingly, the first BLUETOOTH circuit 14 is switched from the sleep state to the working state, and the working state includes the startup state. The first micro-control unit 142 of the first BLUETOOTH circuit 14 that is in the working state obtains the motion index value from the second register 126 of the motion sensing circuit 12. The first BLUETOOTH circuit 14 in the working state sends the beacon to the second BLUETOOTH circuit 16, and then the first micro-control unit 142 of the first BLUETOOTH circuit 14 or the second micro-control unit 162 of the second BLUETOOTH circuit 16 determines whether or not the received signal strength indication between the remote controller KS1 and the controlled device E is greater than or equal to the strength threshold. When the received signal strength indication is greater than or equal to the strength threshold, the second BLUETOOTH circuit 16 is communication-connected with the first BLUETOOTH circuit 14 and the second BLUETOOTH circuit 16 obtains the motion index value from the first BLUETOOTH circuit 14. When the second BLUETOOTH circuit 16 obtains the motion index value, the second BLUETOOTH circuit 16 notifies the first BLUETOOTH circuit 14 to be switched from the working state to the sleep state.

The fourth register 166 of the second BLUETOOTH circuit 16 saves an index comparison table, and the index comparison table includes the multiple motion index values and multiple controlled elements of the controlled device E which respectively correspond to the motion index values. The second BLUETOOTH circuit 16 determines the corresponding controlled element of the controlled device E according to the motion index value obtained from the first BLUETOOTH circuit 14 and the index comparison table. For example, the controlled device E is a motorbike, the controlled element of the controlled device E is a seat cover of the motorbike when the motion index value is 0, the controlled element is an engine of the motorbike when the motion index value is 1, and the controlled element is a fuel tank cover of the motorbike when the motion index value is 2. The second micro-control unit 162 of the second BLUETOOTH circuit 16 detects at least one operational state of the controlled device E from the controller area network (CAN bus), and the second micro-control unit 162 of the second BLUETOOTH circuit 16 generates a control command according to the at least one operational state of the controlled device E and the motion index value and sends the control command to the electronic control unit (ECU) of the controlled device E. The electronic control unit (ECU) controls the controlled elements of the controlled device E based on the control command from the second micro-control unit 162 of the second BLUETOOTH circuit 16.

Figure 3A:
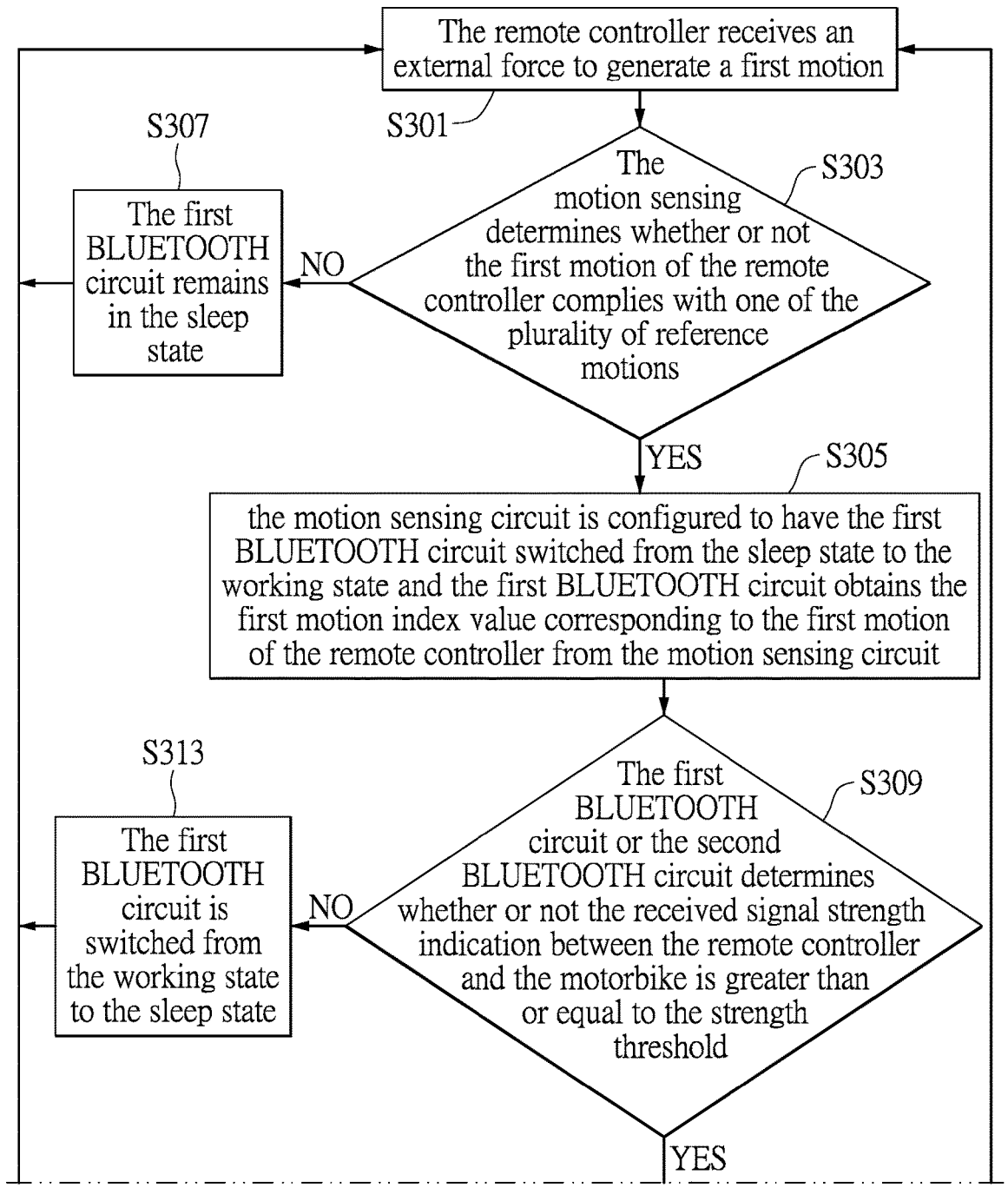
FIGS. 3A and 3B are flowcharts showing a control method of the remote-control system of FIG. 2 with respect to a seat cover of a motorbike.
Figure 3B:
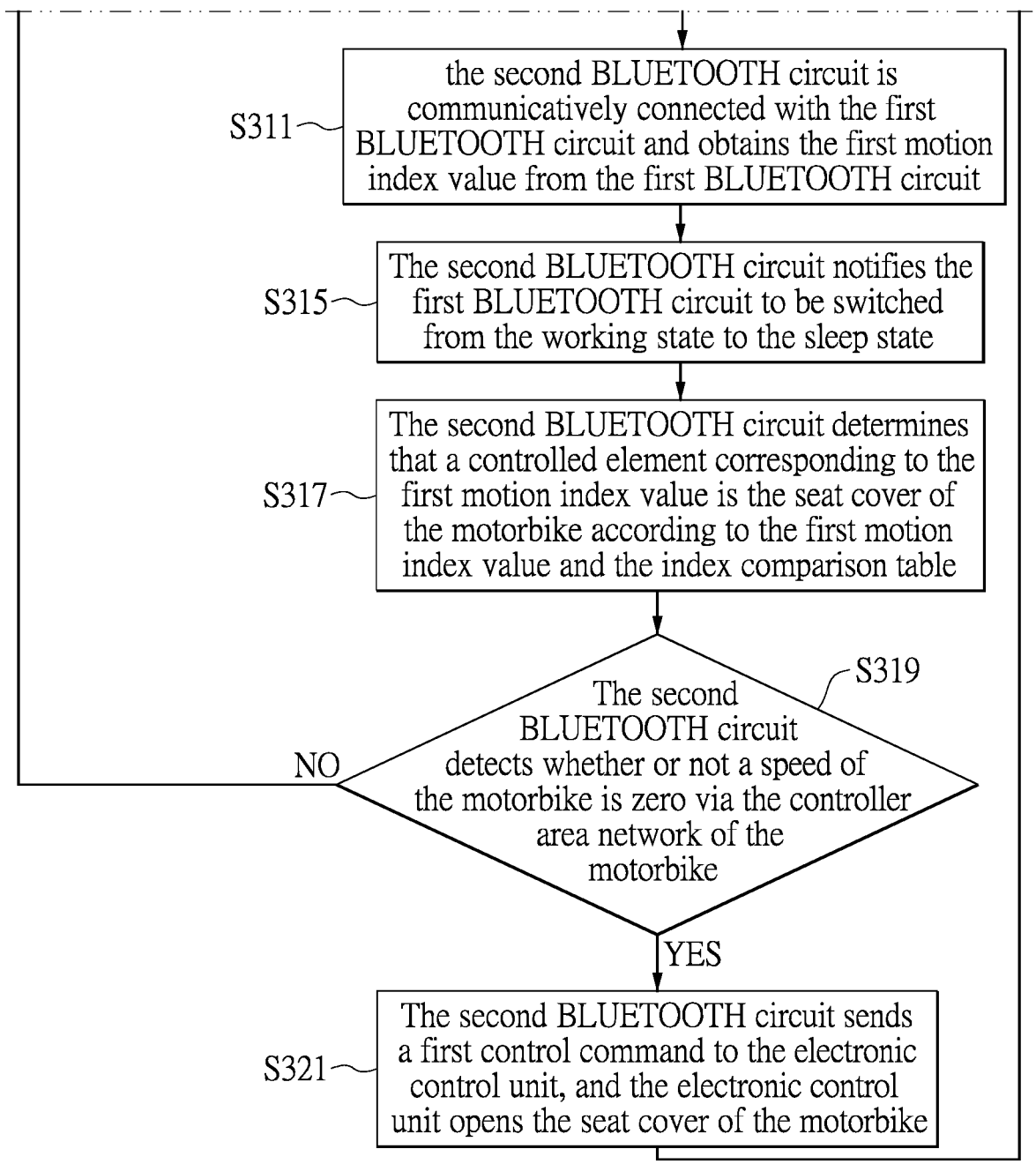

FIGS. 3A and 3B are flowcharts showing a control method of the remote-control system of FIG. 2 with respect to a seat cover of a motorbike. As shown in FIGS. 3A and 3B, in step S301, the remote controller KS1 receives an external force to generate a first motion. For example, when the user clicks on a surface of the remote controller KS1 once, the remote controller KS1 generates the first motion.

Figure 4:
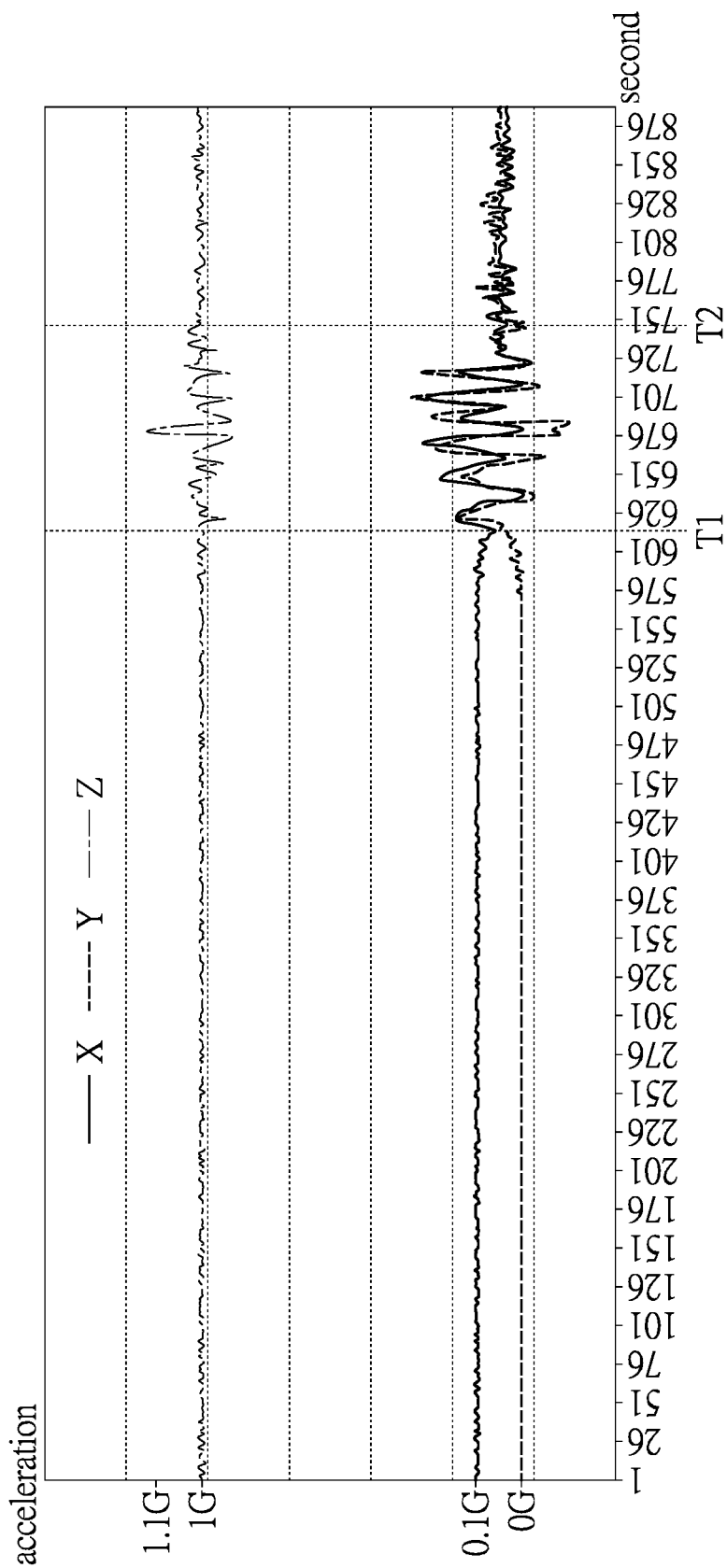
FIG. 4 is a schematic view showing an acceleration change of the remote controller which is clicked once by a user.

FIG. 4 is a schematic view showing an acceleration change of the remote controller which is clicked once by a user. As shown in FIG. 4, the motion sensing circuit 12 detects that an X-axis acceleration, a Y-axis acceleration and a Z-axis acceleration of the remote controller KS1 maintain substantially the same before a first time point T1. When the user clicks the surface of the remote controller KS1 once, the motion sensing circuit 12 detects change in the X-axis acceleration, the Y-axis acceleration and the Z-axis acceleration of the remote controller KS1 between the first time point T1 and a second time point T2. Since the user does not apply the external force to the remote controller KS1 after the second time point T2, the motion sensing circuit 12 detects that the X-axis acceleration, the Y-axis acceleration and the Z-axis acceleration of the remote controller KS1 return to their state before the first time point T1.

Referring to FIGS. 3A and 3B, in step S303, the motion sensing circuit 12 detects the first motion of the remote controller KS1 and determines whether or not the first motion of the remote controller KS1 complies with one of the plurality of reference motions. When the first motion complies with one of the plurality of reference motions, the step S303 is followed by step S305. When the first motion does not comply with one of the plurality of reference motions, the step S303 is followed by step S307.

In the step S305, the motion sensing circuit 12 is configured to have the first BLUETOOTH circuit 14 switched from the sleep state to the working state and the first BLUETOOTH circuit 14 obtains the first motion index value corresponding to the first motion of the remote controller KS1 from the motion sensing circuit 12, and the working state includes the startup state. In the step S307, the first BLUETOOTH circuit 14 remains in the sleep state, and the control method of FIGS. 3A and 3B returns to the step S301.

The step S305 is followed by step S309. In the step S309, the first BLUETOOTH circuit 14 or the second BLUETOOTH circuit 16 determines whether or not the received signal strength indication (RSSI) between the remote controller KS1 and the motorbike is greater than or equal to the strength threshold. The strength threshold can be, for example, −40 dB, but is not limited thereto. When the received signal strength indication (RSSI) is greater than or equal to the strength threshold, the step S309 is followed by step S311. When the received signal strength indication (RSSI) is less than the strength threshold, the step S309 is followed by step S313.

In the step S311, the second BLUETOOTH circuit 16 is communicatively connected with the first BLUETOOTH circuit 14 and obtains the first motion index value from the first BLUETOOTH circuit 14. In the step S313, the first BLUETOOTH circuit 14 is switched from the working state to the sleep state, and the control method of FIGS. 3A and 3B returns to the step S301.

The step S311 is followed by step S315. In the step S315, the second BLUETOOTH circuit 16 notifies the first BLUETOOTH circuit 14 to be switched from the working state to the sleep state.

The step S315 is followed by step S317. In the step S317, the second BLUETOOTH circuit 16 determines that a controlled element corresponding to the first motion index value is the seat cover of the motorbike according to the first motion index value and the index comparison table.

The step S317 is followed by step S319. In the step S319, the second BLUETOOTH circuit 16 detects whether or not a speed of the motorbike is zero via the controller area network (CAN bus) of the motorbike.

When the speed of the motorbike is zero, the step S319 is followed by step S321. When the speed of the motorbike is not zero, the control method of FIGS. 3A and 3B returns to the step S301.

In the step S321, the second BLUETOOTH circuit 16 sends a first control command to the electronic control unit (ECU), and the electronic control unit (ECU) opens the seat cover of the motorbike.

The control method of FIGS. 3A and 3B returns to the step S301.

Figure 5A:
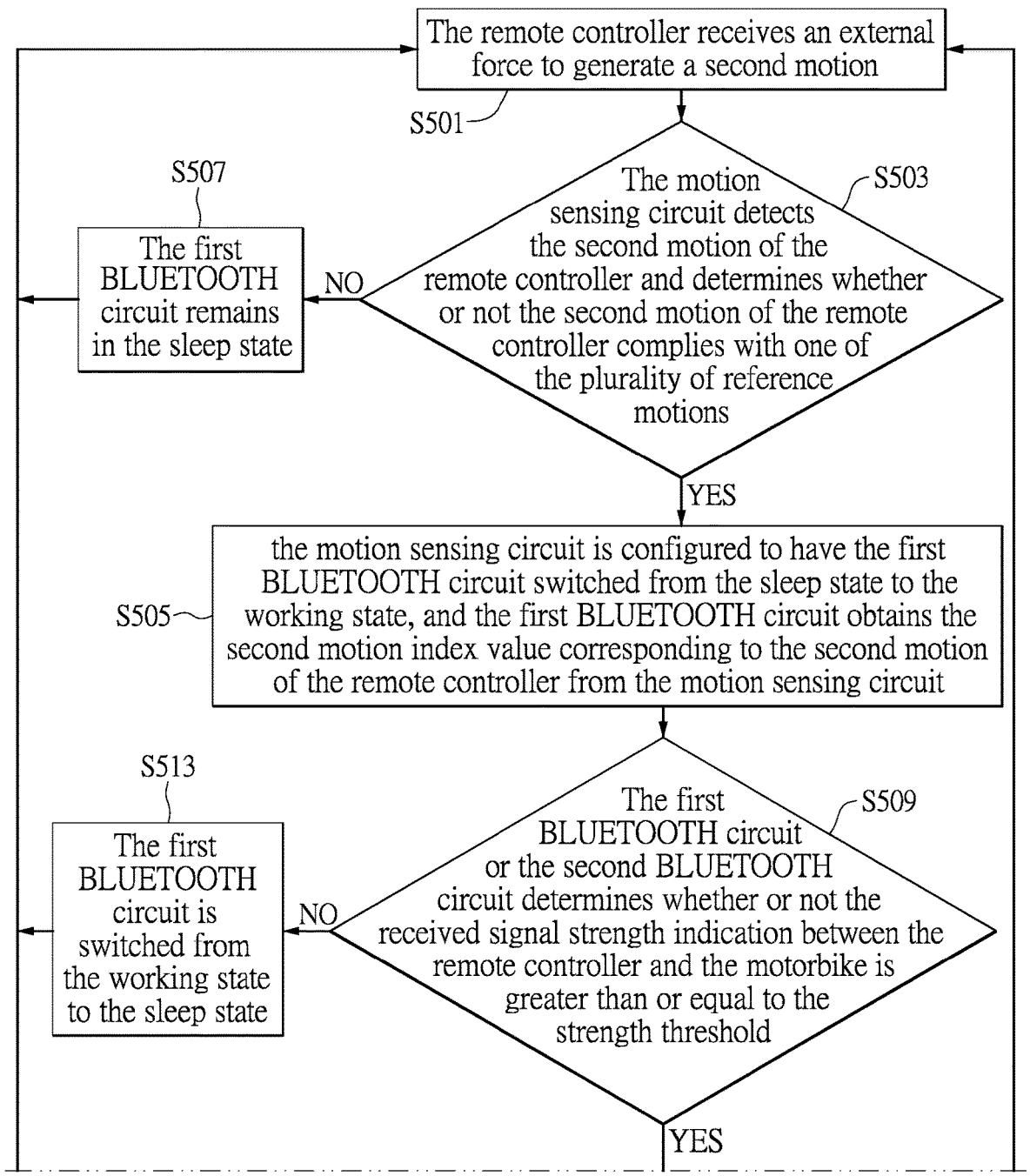
FIGS. 5A and 5B are flowcharts showing a control method of the remote-control system of FIG. 2 with respect to an engine of the motorbike.
Figure 5B:
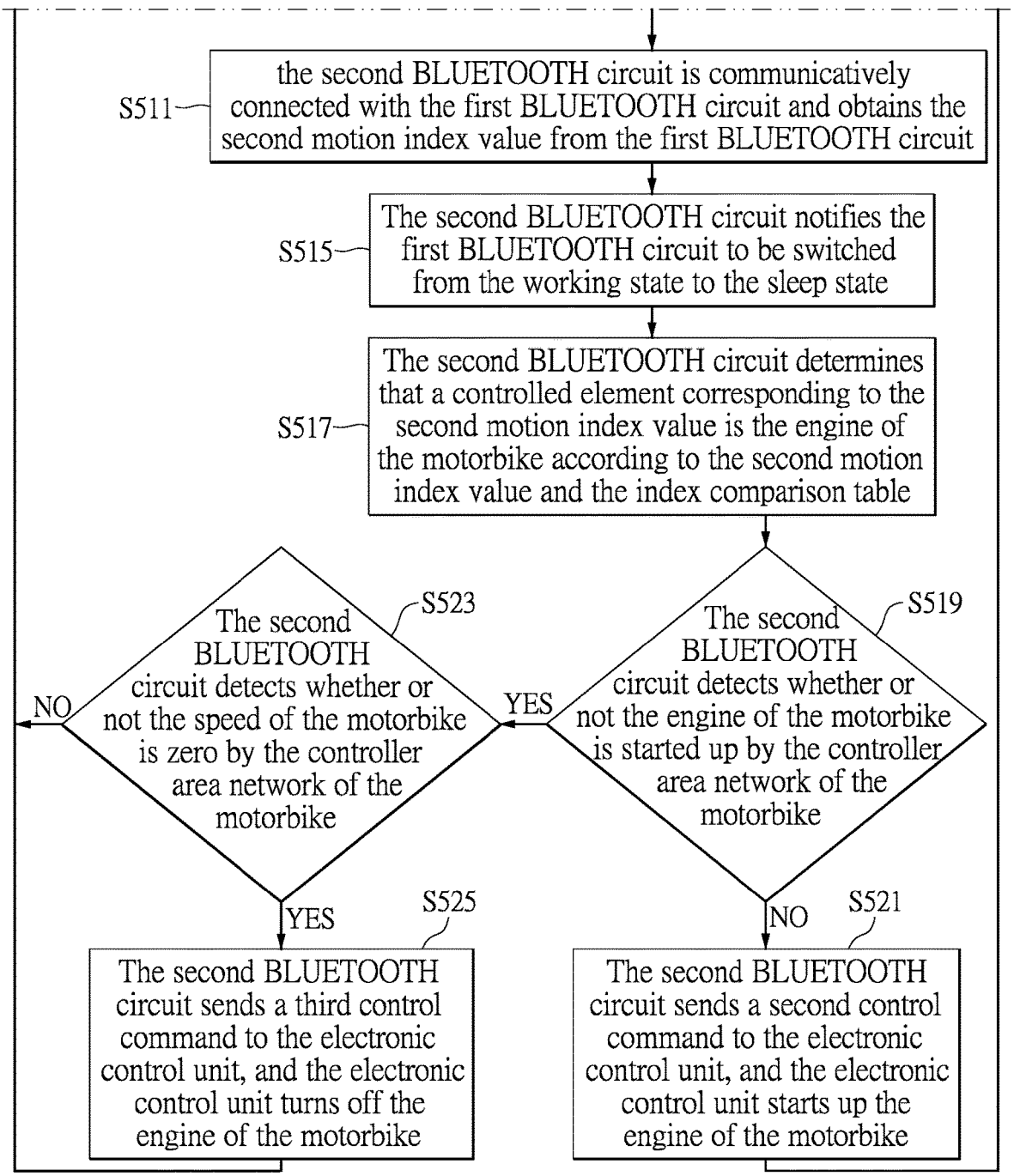

FIGS. 5A and 5B are flowcharts showing a control method of o the remote-control system of FIG. 2 with respect to an engine of the motorbike. As shown in FIGS. 5A and 5B, in step S501, the remote controller KS1 receives an external force to generate a second motion. For example, when the user consecutively clicks the surface of the remote controller KS1 twice, the remote controller KS1 generates the second motion. In step S503, the motion sensing circuit 12 detects the second motion of the remote controller KS1 and determines whether or not the second motion of the remote controller KS1 complies with one of the plurality of reference motions. When the second motion complies with one of the plurality of reference motions, the step S503 is followed by step S505. When the second motion does not comply with one of the plurality of reference motions, the step S503 is followed by step S507.

In the step S505, the motion sensing circuit 12 is configured to have the first BLUETOOTH circuit 14 switched from the sleep state to the working state, and the first BLUETOOTH circuit 14 obtains the second motion index value corresponding to the second motion of the remote controller KS1 from the motion sensing circuit 12. In the step S507, the first BLUETOOTH circuit 14 remains in the sleep state, and the control method of FIGS. 5A-5B returns to the step S501.

The step S505 is followed by step S509. In the step S509, the first BLUETOOTH circuit 14 or the second BLUETOOTH circuit 16 determines whether or not the received signal strength indication (RSSI) between the remote controller KS1 and the motorbike is greater than or equal to the strength threshold. The strength threshold can be, for example, −40 dB, but is not limited thereto. When the received signal strength indication (RSSI) is greater than or equal to the strength threshold, the step S509 is followed by step S511. When the received signal strength indication (RSSI) is less than the strength threshold, the step S509 is followed by step S513.

In the step S511, the second BLUETOOTH circuit 16 is communicatively connected with the first BLUETOOTH circuit 14 and obtains the second motion index value from the first BLUETOOTH circuit 14. In the step S513, the first BLUETOOTH circuit 14 is switched from the working state to the sleep state, and the control method of FIGS. 5A and 5B returns to the step S501.

The step S511 is followed by step S515. In the step S515, the second BLUETOOTH circuit 16 notifies the first BLUETOOTH circuit 14 to be switched from the working state to the sleep state.

The step S515 is followed by step S517. In the step S517, the second BLUETOOTH circuit 16 determines that a controlled element corresponding to the second motion index value is the engine of the motorbike according to the second motion index value and the index comparison table.

The step S517 is followed step S519. In the step S519, the second BLUETOOTH circuit 16 detects whether or not the engine of the motorbike is started up by the controller area network (CAN bus) of the motorbike.

In the step S519, when the engine of the motorbike is not started up, the step S519 is followed by step S521. When the engine of the motorbike is started up, the step S519 is followed by step S523.

In the step S521, the second BLUETOOTH circuit 16 sends a second control command to the electronic control unit (ECU), and the electronic control unit (ECU) starts up the engine of the motorbike. In the step S523, the second BLUETOOTH circuit 16 detects whether or not the speed of the motorbike is zero by the controller area network (CAN bus) of the motorbike.

The control method of FIGS. 5A and 5B returns to the step S501 after the step S521.

When the speed of the motorbike is zero, the step S523 is followed by step S525. When the motorbike speed is not zero, the control method of FIGS. 5A and 5B returns to the step S501.

In the step S525, the second BLUETOOTH circuit 16 sends a third control command to the electronic control unit (ECU), and the electronic control unit (ECU) turns off the engine of the motorbike.

The control method of FIGS. 5A and 5B returns to the step S501 after the step S525.

Figure 6A:
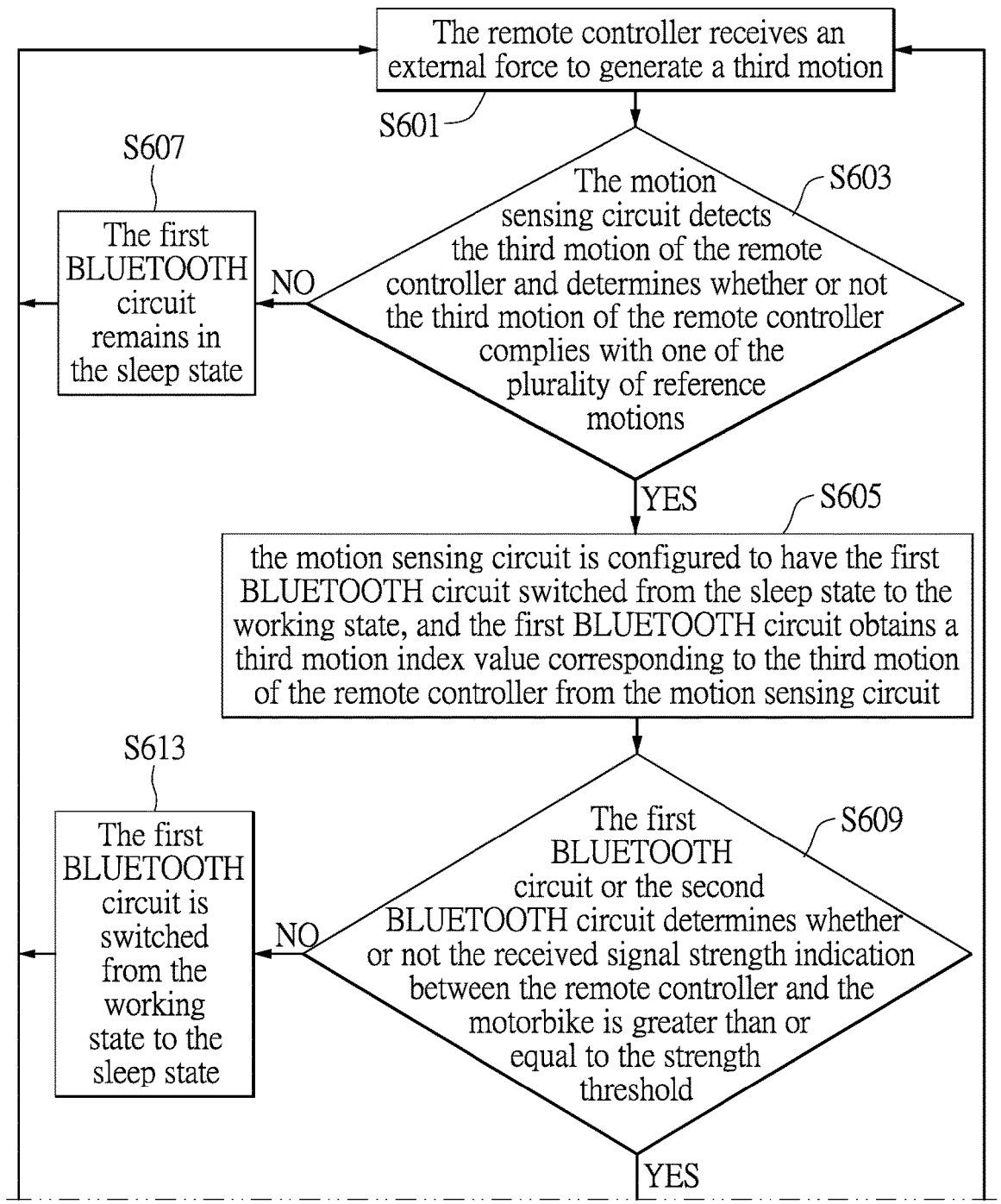
FIGS. 6A and 6B are flowcharts showing a control method of the remote-control system of FIG. 2 with respect to a fuel tank cover of the motorbike.
Figure 6B:
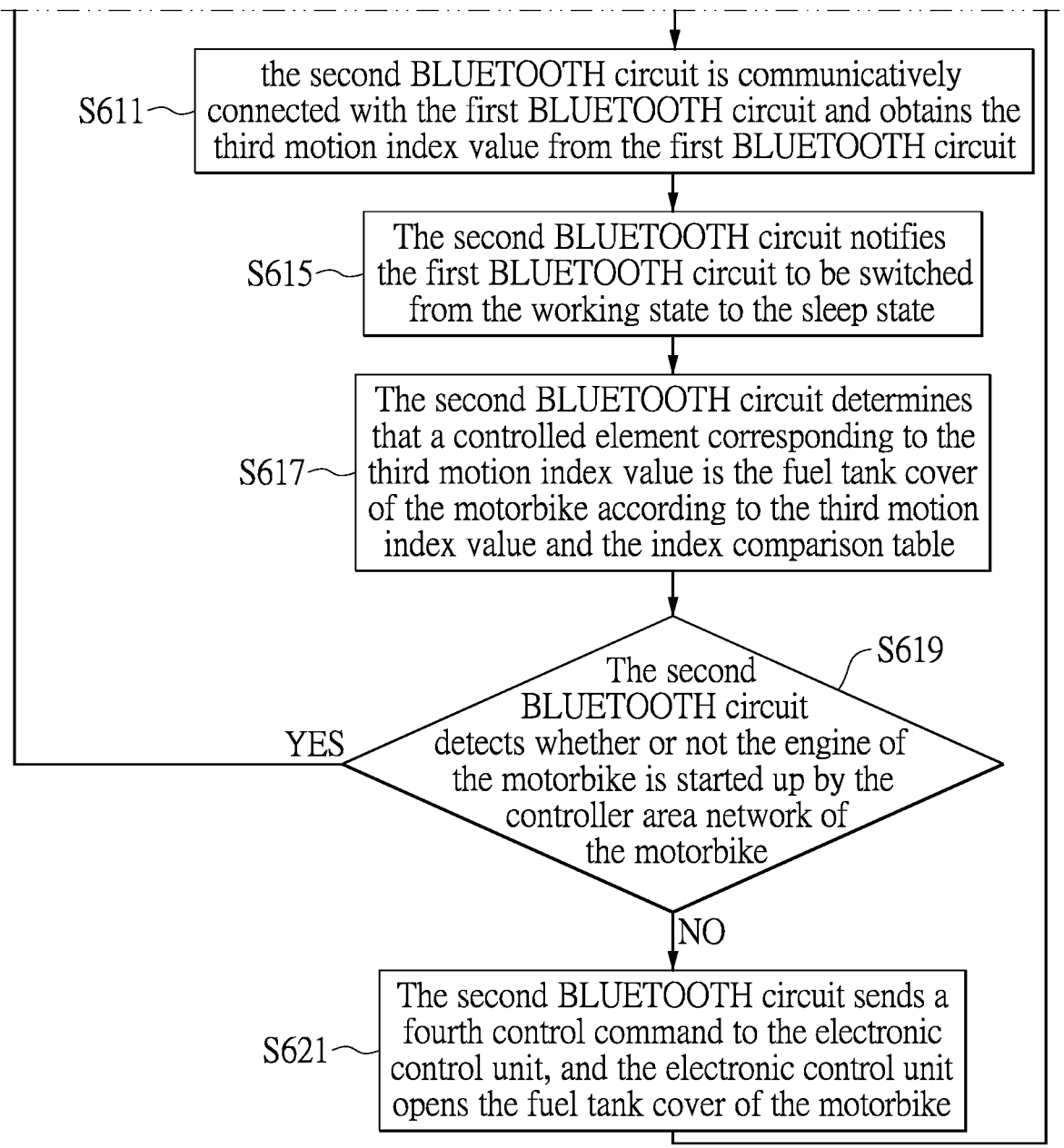

FIGS. 6A and 6B are flowcharts showing a control method of the remote-control system of FIG. 2 with respect to a fuel tank cover of the motorbike. As shown in FIGS. 6A and 6B, in a step S601, the remote controller KS1 receives an external force to generate a third motion. For example, when the user consecutively clicks the surface of the remote controller KS1 three times, the remote controller KS1 generates the third motion.

The step S601 is followed by step S603. In the step S603, the motion sensing circuit 12 detects the third motion of the remote controller KS1 and determines whether or not the third motion of the remote controller KS1 complies with one of the plurality of reference motions. When the third motion complies with one of the plurality of reference motions, the step S603 is followed by step S605. When the third motion does not comply with one of the plurality of reference motions, the step S603 is followed by step S607.

In the step S605, the motion sensing circuit 12 is configured to have the first BLUETOOTH circuit 14 switched from the sleep state to the working state, and the first BLUETOOTH circuit 14 obtains a third motion index value corresponding to the third motion of the remote controller KS1 from the motion sensing circuit 12. In the step S607, the first BLUETOOTH circuit 14 remains in the sleep state, and the control method of FIGS. 6A and 6B returns to the step S601.

The step S605 is followed by step S609. In the step S609, the first BLUETOOTH circuit 14 or the second BLUETOOTH circuit 16 determines whether or not the received signal strength indication (RSSI) between the remote controller KS1 and the motorbike is greater than or equal to the strength threshold. The strength threshold can be, for example, −40 dB, but is not limited thereto. When the received signal strength indication (RSSI) is greater than or equal to the strength threshold, the step S609 is followed by step S611. When the received signal strength indication (RSSI) is less than the strength threshold, the step S609 is followed by step S613.

In the step S611, the second BLUETOOTH circuit 16 is communicatively connected with the first BLUETOOTH circuit 14 and obtains the third motion index value from the first BLUETOOTH circuit 14. In the step S613, the first BLUETOOTH circuit 14 is switched from the working state to the sleep state, and the control method of FIGS. 6A and 6B returns to the step S601.

The step S611 is followed by step S615. In the step S615, the second BLUETOOTH circuit 16 notifies the first BLUETOOTH circuit 14 to be switched from the working state to the sleep state.

The step S615 is followed by step S617. In the step S617, the second BLUETOOTH circuit 16 determines that a controlled element corresponding to the third motion index value is the fuel tank cover of the motorbike according to the third motion index value and the index comparison table.

The step S617 is followed step S619. In the step S619, the second BLUETOOTH circuit 16 detects whether or not the engine of the motorbike is started up by the controller area network (CAN bus) of the motorbike.

When the engine of the motorbike is not started up, the step S619 is followed by step S621. When the engine of the motorbike is started up, the control method of FIGS. 6A and 6B returns to the step S601 after the step S619.

In the step S621, the second BLUETOOTH circuit 16 sends a fourth control command to the electronic control unit (ECU), and the electronic control unit (ECU) opens the fuel tank cover of the motorbike. Then, the control method of FIGS. 6A and 6B returns to the step S601 after the step S621.

Figure 7:
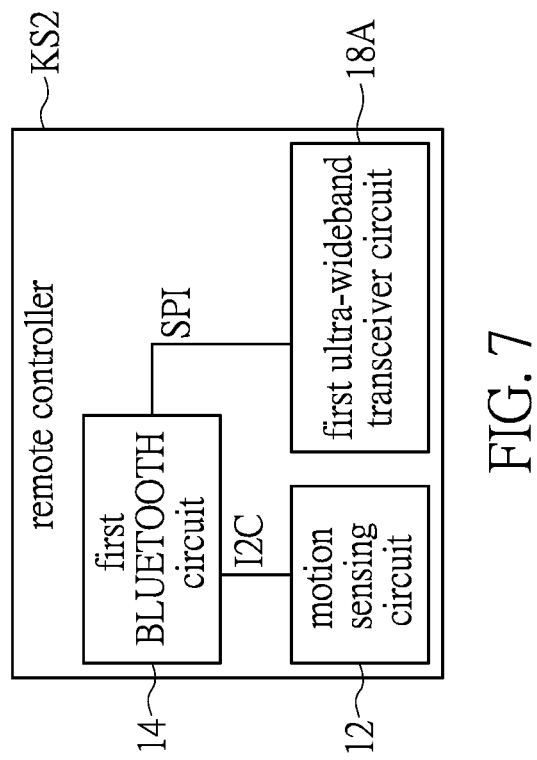
FIG. 7 is a circuit block diagram of a remote controller according to a second embodiment of the present disclosure.

FIG. 7 is a circuit block diagram of a remote controller according to a second embodiment of the present disclosure. As shown in FIG. 7, a remote controller KS2 includes the motion sensing circuit 12, the first BLUETOOTH circuit 14 and a first ultra-wideband (UWB) transceiver circuit 18A. For example, the first BLUETOOTH circuit 14 may be a BLUETOOTH low energy circuit. The first BLUETOOTH circuit 14 is in the sleep state, the motion sensing circuit 12 is electrically connected to the first BLUETOOTH circuit 14 through an inter-integrated circuit bus, and the first ultra-wideband transceiver circuit 18A is electrically connected to the first BLUETOOTH circuit 14 through a serial peripheral interface (SPI).

The motion sensing circuit 12 of the remote controller KS2 is the same as the motion sensing circuit 12 of the remote controller KS1 of FIG. 1, and the first BLUETOOTH circuit 14 of the remote controller KS2 is the same as the first BLUETOOTH circuit 14 of the remote controller KS1 of FIG. 1. When the motion sensing circuit 12 of the remote controller KS2 detects a motion of the remote controller KS2 caused by an external force and determines that the motion of the remote controller KS2 complies with one of a plurality of reference motions, the motion sensing circuit 12 is configured to have the first BLUETOOTH circuit 14 switched from the sleep state to the working state, and the first BLUETOOTH circuit 14 in the working state obtains a motion index value corresponding to the motion of the remote controller KS2 from the motion sensing circuit 12.

The first ultra-wideband transceiver circuit 18A includes an antenna and is in the sleep state. When the first BLUETOOTH circuit 14 is in the working state, the first BLUETOOTH circuit 14 (of low energy consumption) is configured to have the first ultra-wideband transceiver circuit 18A switched from the sleep state to the working state, and the working state includes the startup state.

Figure 8:
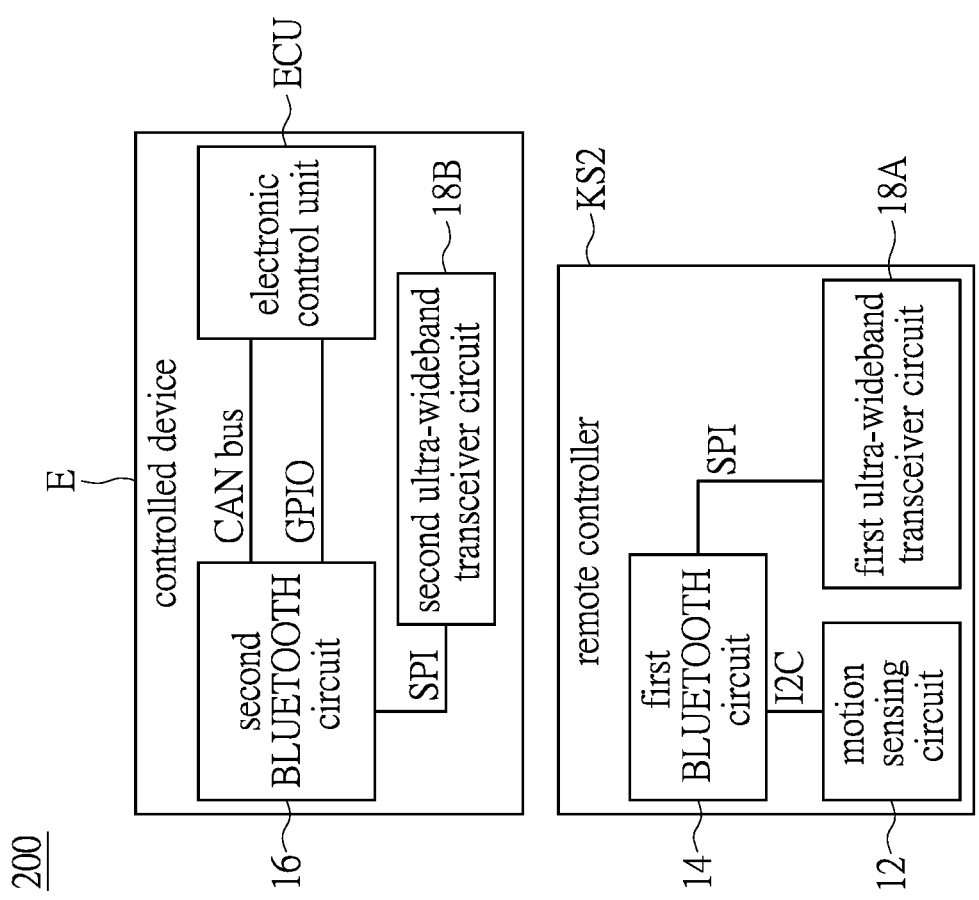
FIG. 8 is a circuit block diagram of a remote-control system according to the second embodiment of the present disclosure.

FIG. 8 is a circuit block diagram of a remote-control system according to the second embodiment of the present disclosure. As shown in FIG. 8, a remote-control system 200 includes the remote controller KS2 of FIG. 7, the second BLUETOOTH circuit 16 and a second ultra-wideband transceiver circuit 18B. For example, the second BLUETOOTH circuit 16 may be a BLUETOOTH low energy circuit. The second ultra-wideband transceiver circuit 18B is electrically connected to the second BLUETOOTH circuit 16 by the serial peripheral interface (SPI), and the second BLUETOOTH circuit 16 and the second ultra-wideband transceiver circuit 18B are arranged in the controlled device E. The second ultra-wideband transceiver circuit 18B includes an antenna and is in the sleep state. When the first BLUETOOTH circuit 14 of the remote controller KS2 is in the working state, the first BLUETOOTH circuit 14 obtains the motion index value corresponding to the motion of the remote controller KS2 from the motion sensing circuit 12. The first BLUETOOTH circuit 14 or the second BLUETOOTH circuit 16 determines whether or not a received signal strength indication between the remote controller KS2 and the motorbike is greater than or equal to a strength threshold. When the received signal strength indication (RSSI) is greater than or equal to the strength threshold, the first BLUETOOTH circuit 14 and the second BLUETOOTH circuit 16 are configured to respectively have the first ultra-wideband transceiver circuit 18A and the second ultra-wideband transceiver circuit 18B switched from the sleep state to the working state. In addition, the second ultra-wideband transceiver circuit 18B measures a distance between the remote controller KS2 and the controlled device E. When the received signal strength indication is less than the strength threshold, the first BLUETOOTH circuit 14 is switched from the working state to the sleep state.

When the second ultra-wideband transceiver circuit 18B determines that the distance between the remote controller KS2 and the controlled device E is within a preset distance range (e.g., 0 cm to 150 cm), the second BLUETOOTH circuit 16 is communicatively connected with the first BLUETOOTH circuit 14 and obtains a motion index value from the first BLUETOOTH circuit 14. When the distance between the remote controller KS2 and the controlled device E is not within the preset distance range (e.g., greater than 150 cm), the first BLUETOOTH circuit 14 of the remote controller KS2 is switched from the working state to the sleep state.

After the second BLUETOOTH circuit 16 obtains the motion index value from the first BLUETOOTH circuit 14, the second BLUETOOTH circuit 16 notifies the first BLUETOOTH circuit 14 to be switched from the working state to the sleep state. The second BLUETOOTH circuit 16 determines a controlled element of the controlled device E corresponding to the motion index value according to the motion index value and the index comparison table.

The second BLUETOOTH circuit 16 detects at least one operational state of the controlled device E from the controller area network (CAN bus). The second BLUETOOTH circuit 16 generates a control command according to the at least one operational state of the controlled device E and the motion index value, and sends the control command to the electronic control unit (ECU) of the controlled device E. The electronic control unit (ECU) controls the controlled elements of the controlled device E according to the control command from the second BLUETOOTH circuit 16.

Figure 9A:
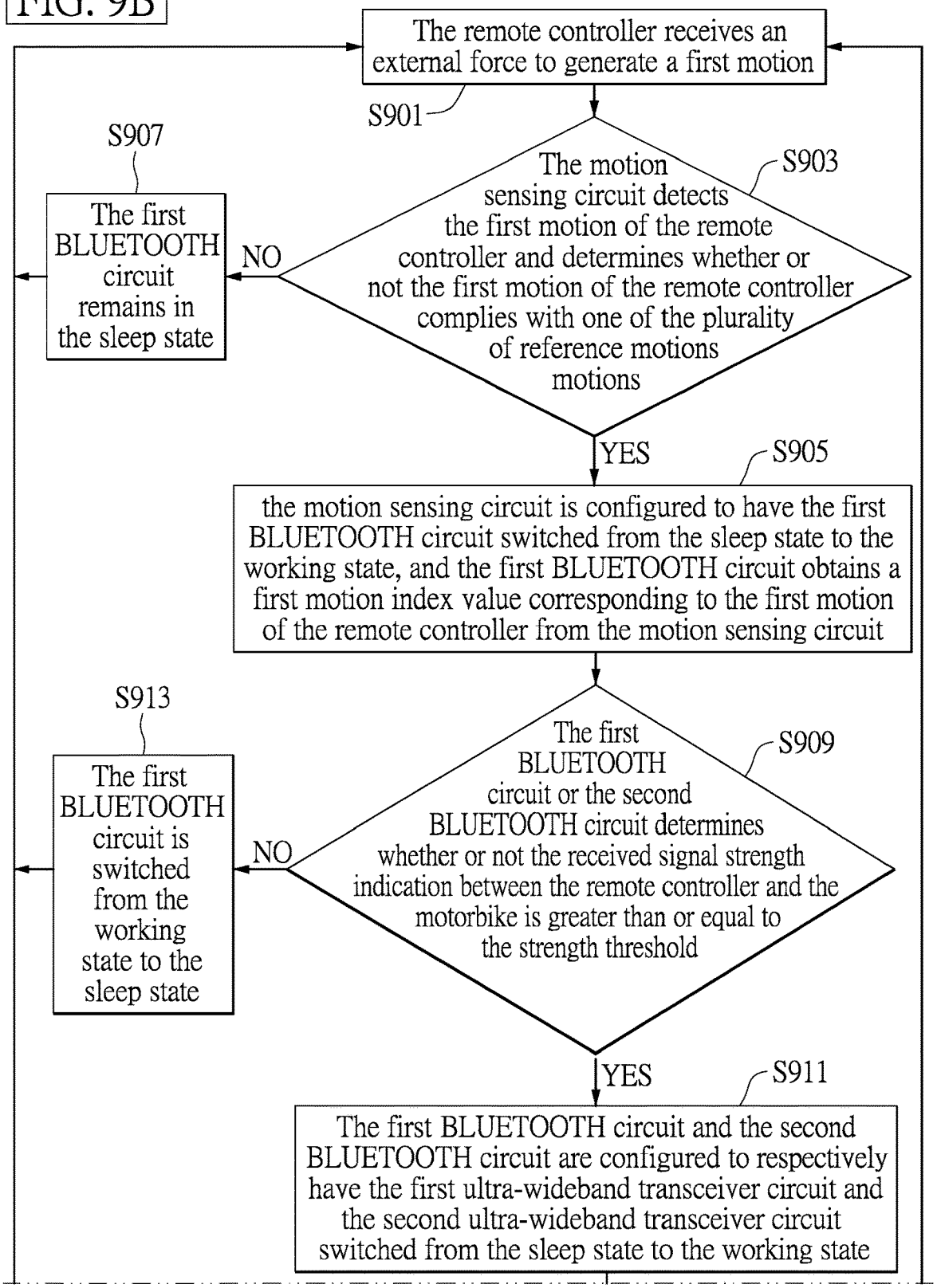
FIGS. 9A and 9B are flowcharts showing a control method of the remote-control system of FIG. 8 with respect to the seat cover of the motorbike.
Figure 9B:
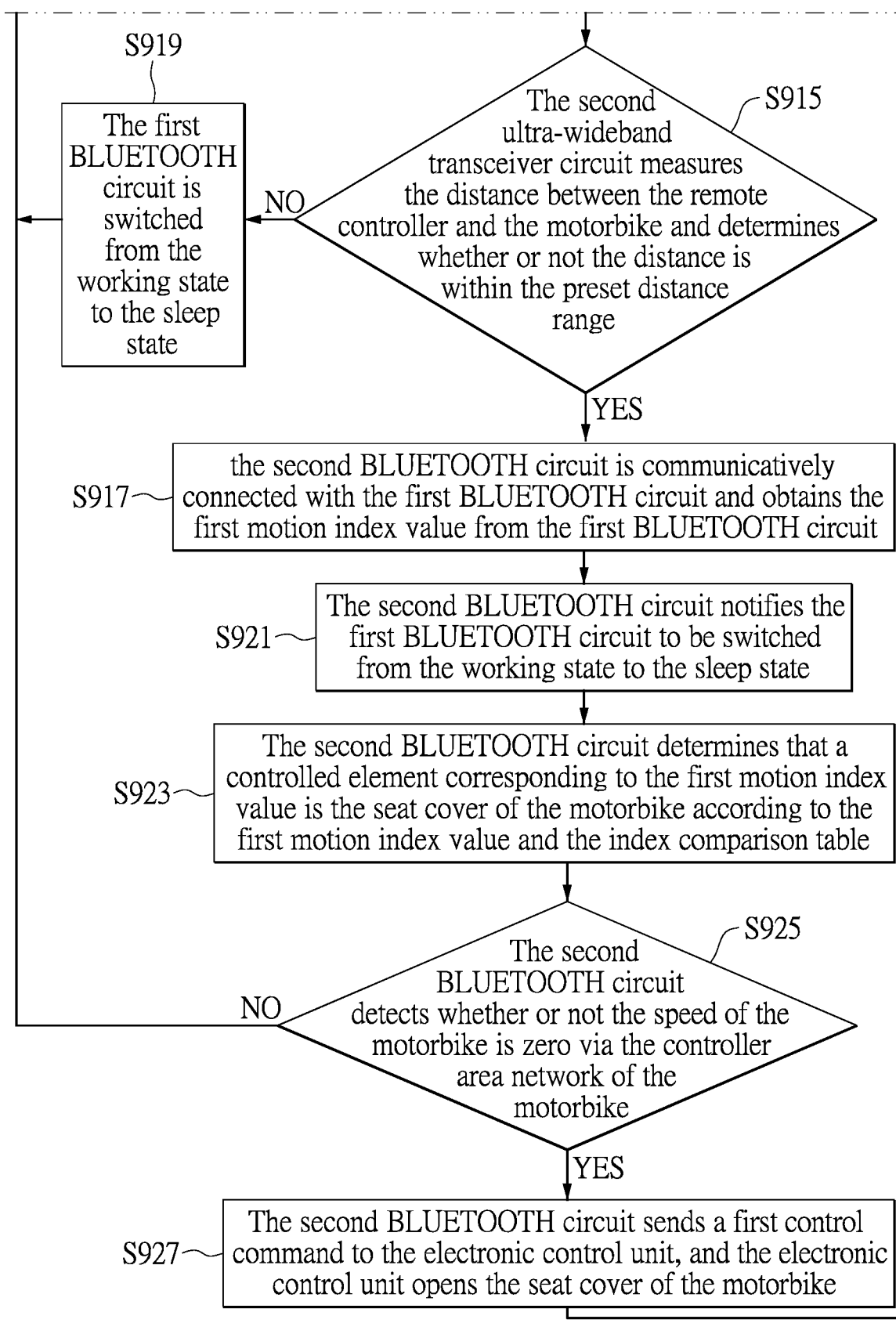

FIGS. 9A and 9B are flowcharts showing a control method of the remote-control system of FIG. 8 with respect to the seat cover of the motorbike. As shown in FIGS. 9A and 9B, in step S901, the remote controller KS2 receives an external force to generate a first motion. For example, when the user clicks on a surface of the remote controller KS2 once, the remote controller KS2 generates the first motion.

In step S903, the motion sensing circuit 12 detects the first motion of the remote controller KS2 and determines whether or not the first motion of the remote controller KS2 complies with one of the plurality of reference motions. When the first motion complies with one of the plurality of reference motions, the step S903 is followed by step S905. When the first motion does not comply with one of the plurality of reference motions, the step S903 is followed by step S907.

In the step S905, the motion sensing circuit 12 is configured to have the first BLUETOOTH circuit 14 switched from the sleep state to the working state, and the first BLUETOOTH circuit 14 obtains a first motion index value corresponding to the first motion of the remote controller KS2 from the motion sensing circuit 12. In the step S907, the first BLUETOOTH circuit 14 remains in the sleep state, and the control method of FIGS. 9A and 9B returns to the step S901.

The step S905 is followed by step S909. In the step S909, the first BLUETOOTH circuit 14 or the second BLUETOOTH circuit 16 determines whether or not the received signal strength indication (RSSI) between the remote controller KS2 and the motorbike is greater than or equal to the strength threshold. The strength threshold can be, for example, −55 dB, but is not limited thereto. When the received signal strength indication (RSSI) is greater than or equal to the strength threshold, the step S909 is followed by step S911. When the received signal strength indication (RSSI) is less than the strength threshold, the step S909 is followed by a step S913.

In the step S911, the first BLUETOOTH circuit 14 and the second BLUETOOTH circuit 16 are configured to respectively have the first ultra-wideband transceiver circuit 18A and the second ultra-wideband transceiver circuit 18B switched from the sleep state to the working state. In the step S913, the first BLUETOOTH circuit 14 is switched from the working state to the sleep state, and the control method of FIGS. 9A and 9B returns to the step S901.

The step S911 is followed by step S915. In the step S915, the second ultra-wideband transceiver circuit 18B measures the distance between the remote controller KS2 and the motorbike and determines whether or not the distance is within the preset distance range (for example, but not limited to, 0 cm to 150 cm).

When the distance between the remote controller KS2 and the motorbike is within the preset distance range, the step S915 is followed by step S917. When the distance between the remote controller KS2 and the motorbike is not within the preset distance range, the step S915 is followed by step S919.

In the step S917, the second BLUETOOTH circuit 16 is communicatively connected with the first BLUETOOTH circuit 14 and obtains the first motion index value from the first BLUETOOTH circuit 14. In the step S919, the first BLUETOOTH circuit 14 is switched from the working state to the sleep state, and the control method of FIGS. 9A and 9B returns to the step S901.

The step S917 is followed by step S921. In the step S921, the second BLUETOOTH circuit 16 notifies the first BLUETOOTH circuit 14 to be switched from the working state to the sleep state.

The step S921 is followed by step S923. In the step S923, the second BLUETOOTH circuit 16 determines that a controlled element corresponding to the first motion index value is the seat cover of the motorbike according to the first motion index value and the index comparison table.

The step S923 is followed by step S925. In the step S925, the second BLUETOOTH circuit 16 detects whether or not the speed of the motorbike is zero via the controller area network (CAN bus) of the motorbike. When the speed of the motorbike is zero, the step S925 is followed by step S927. When the speed of the motorbike is not zero, the control method of FIGS. 9A and 9B returns to the step S901 after the step S925.

In the step S927, the second BLUETOOTH circuit 16 sends a first control command to the electronic control unit (ECU), and the electronic control unit (ECU) opens the seat cover of the motorbike.

The control method of FIGS. 9A and 9B returns to the step S901 after the step S927.

Figure 10A:
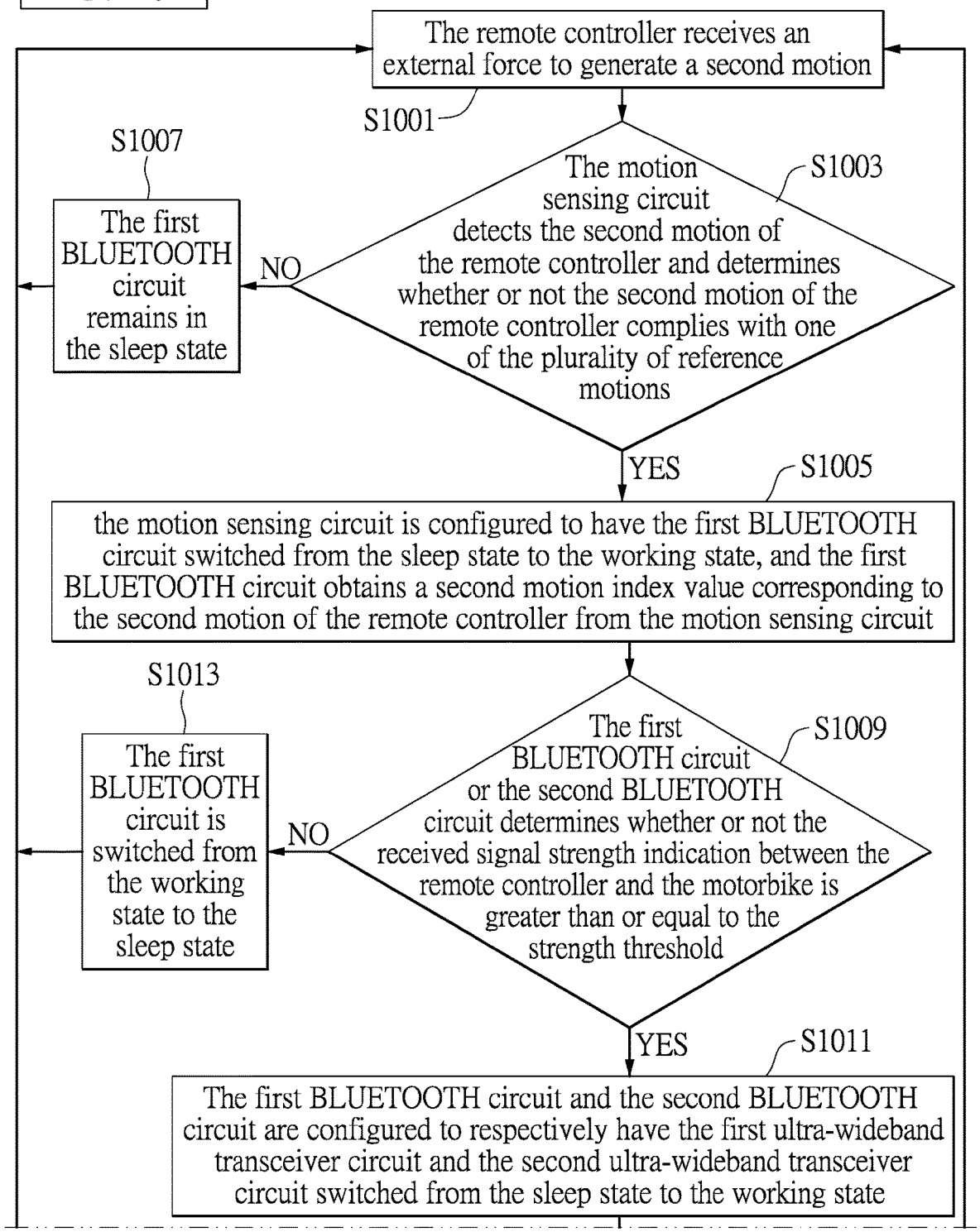
FIGS. 10A and 10B are flowcharts showing a control method of the remote-control system of FIG. 8 with respect to the engine of the motorbike.
Figure 10B:
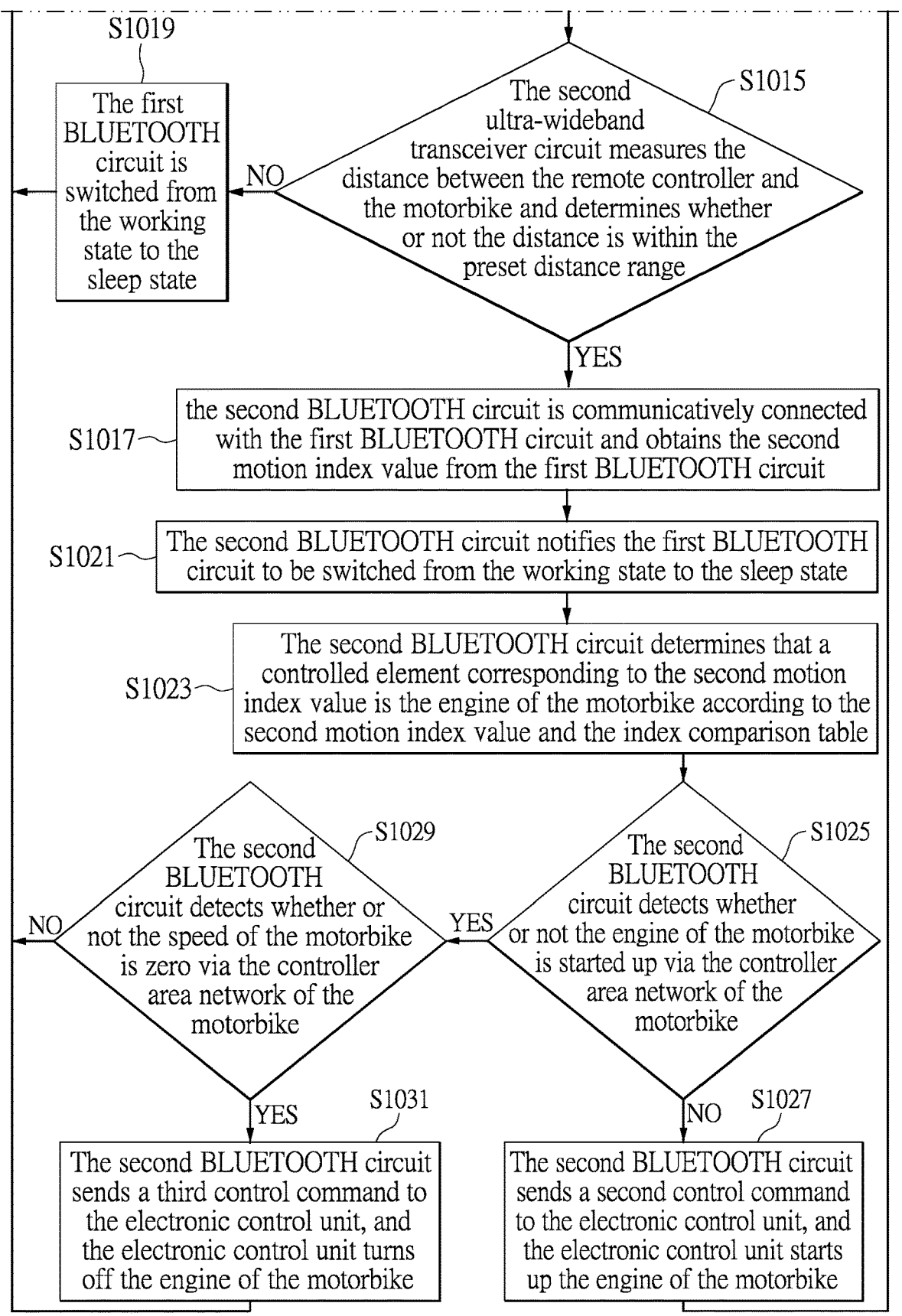

FIGS. 10A and 10B are flowchart showing a control method of the remote-control system of FIG. 8 with respect to the engine of the motorbike. As shown in FIGS. 10A and 10B, in step S1001, the remote controller KS2 receives an external force to generate a second motion. For example, when the user consecutively clicks on the surface of the remote controller KS2 twice, the remote controller KS2 generates the second motion. In step S1003, the motion sensing circuit 12 detects the second motion of the remote controller KS2 and determines whether or not the second motion of the remote controller KS2 complies with one of the plurality of reference motions. When the second motion complies with one of the reference motions, the step S1003 is followed by step S1005. When the second motion does not comply with one of the plurality of reference motions, the step S1003 is followed by step S1007.

In the step S1005, the motion sensing circuit 12 is configured to have the first BLUETOOTH circuit 14 switched from the sleep state to the working state, and the first BLUETOOTH circuit 14 obtains a second motion index value corresponding to the second motion of the remote controller KS2 from the motion sensing circuit 12. In the step S1007, the first BLUETOOTH circuit 14 remains in the sleep state, and the control method of FIGS. 10A-10B returns to the step S1001.

The step S1005 is followed by step S1009. In the step S1009, the first BLUETOOTH circuit 14 or the second BLUETOOTH circuit 16 determines whether or not the received signal strength indication (RSSI) between the remote controller KS2 and the motorbike is greater than or equal to the strength threshold. The strength threshold can be, for example, −55 dB, but is not limited thereto. When the received signal strength indication (RSSI) is greater than or equal to the strength threshold, the step S1009 is followed by step S1011. When the received signal strength indication (RSSI) is less than the strength threshold, the step S1009 is followed by step S1013.

In the step S1011, the first BLUETOOTH circuit 14 and the second BLUETOOTH circuit 16 are configured to respectively have the first ultra-wideband transceiver circuit 18A and the second ultra-wideband transceiver circuit 18B switched from the sleep state to the working state. In the step S1013, the first BLUETOOTH circuit 14 is switched from the working state to the sleep state, and the control method of FIGS. 10A and 10B returns to the step S1001.

The step S1011 is followed by step S1015. In the step S1015, the second ultra-wideband transceiver circuit 18B measures the distance between the remote controller KS2 and the motorbike and determines whether or not the distance is within the preset distance range (for example, but not limited to, 0 cm to 150 cm).

When the distance between the remote controller KS2 and the motorbike is within the preset distance range, the step S1015 is followed by step S1017. When the distance between the remote controller KS2 and the motorbike is not within the preset distance range, the step S1015 is followed by step S1019.

In the step S1017, the second BLUETOOTH circuit 16 is communicatively connected with the first BLUETOOTH circuit 14 and obtains the second motion index value from the first BLUETOOTH circuit 14. In the step S1019, the first BLUETOOTH circuit 14 is switched from the working state to the sleep state, and the control method of FIGS. 10A and 10B returns to the step S1001.

The step S1017 is followed by step S1021. In the step S1021, the second BLUETOOTH circuit 16 notifies the first BLUETOOTH circuit 14 to be switched from the working state to the sleep state.

The step S1021 is followed by step S1023. In the step S1023, the second BLUETOOTH circuit 16 determines that a controlled element corresponding to the second motion index value is the engine of the motorbike according to the second motion index value and the index comparison table.

The step S1023 is followed by step S1025. In the step S1025, the second BLUETOOTH circuit 16 detects whether or not the engine of the motorbike is started up via the controller area network (CAN bus) of the motorbike. When the engine of the motorbike is not started up, the step S1025 is followed by step S1027. When the engine of the motorbike is started up, the step S1025 is followed by step S1029.

In the step S1027, the second BLUETOOTH circuit 16 sends a second control command to the electronic control unit (ECU), and the electronic control unit (ECU) starts up the engine of the motorbike. In the step S1029, the second BLUETOOTH circuit 16 detects whether or not the speed of the motorbike is zero via the controller area network (CAN bus) of the motorbike.

The control method of FIGS. 10A-10B returns to the step S1001 after the step S1027.

When the speed of the motorbike is zero, the step S1029 is followed by step S1031. When the speed of the motorbike is not zero, the control method of FIGS. 10A and 10B returns to the step S1001 after the step S1029.

In the step S1031, the second BLUETOOTH circuit 16 sends a third control command to the electronic control unit (ECU), and the electronic control unit (ECU) turns off the engine of the motorbike. Then, the control method of FIGS. 10A and 10B returns to the step S1001 after the step S1031.

Figure 11A:
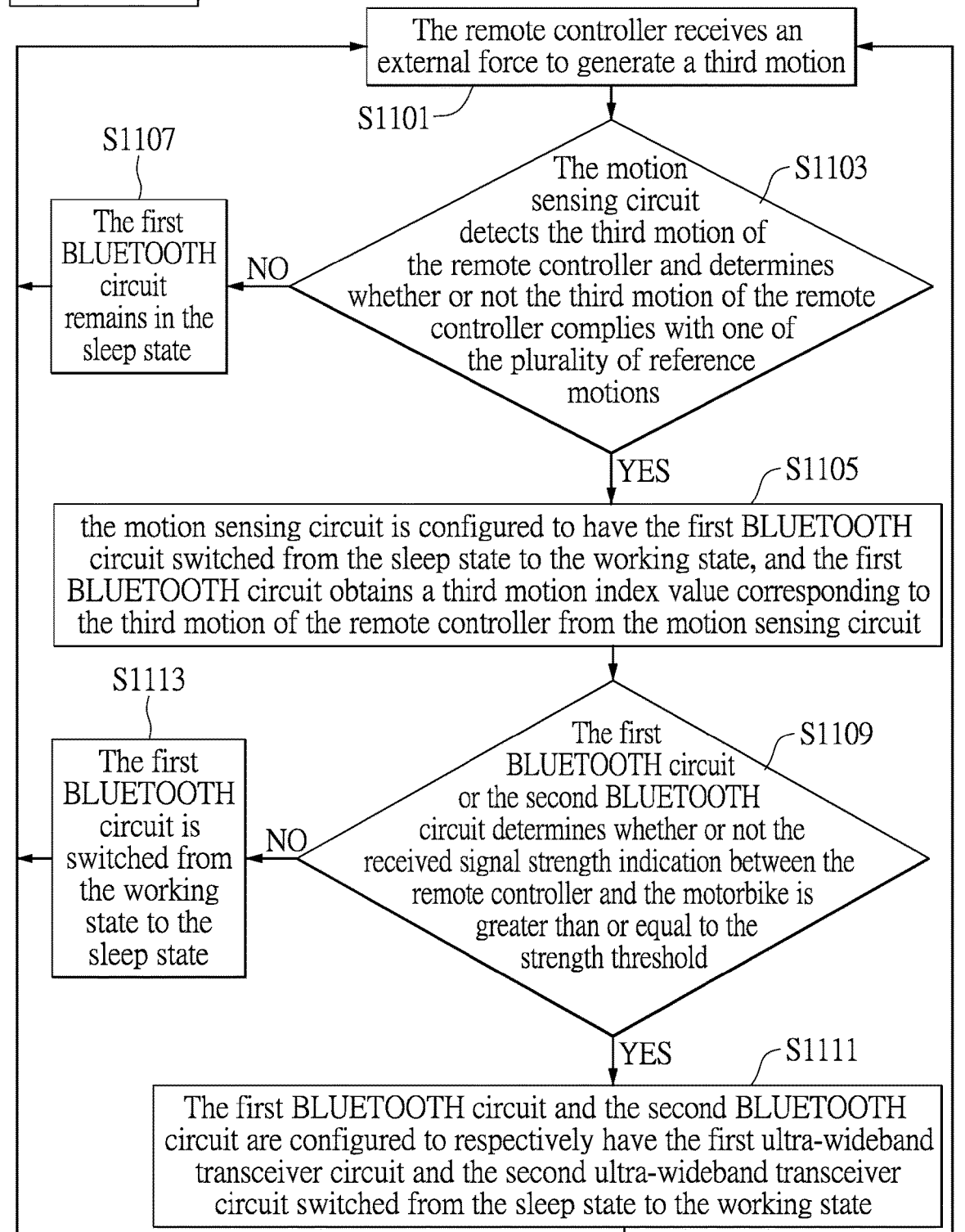
FIGS. 11A and 11B are flowcharts showing a control method of the remote-control system of FIG. 8 with respect to the fuel tank cover of the motorbike.
Figure 11B:
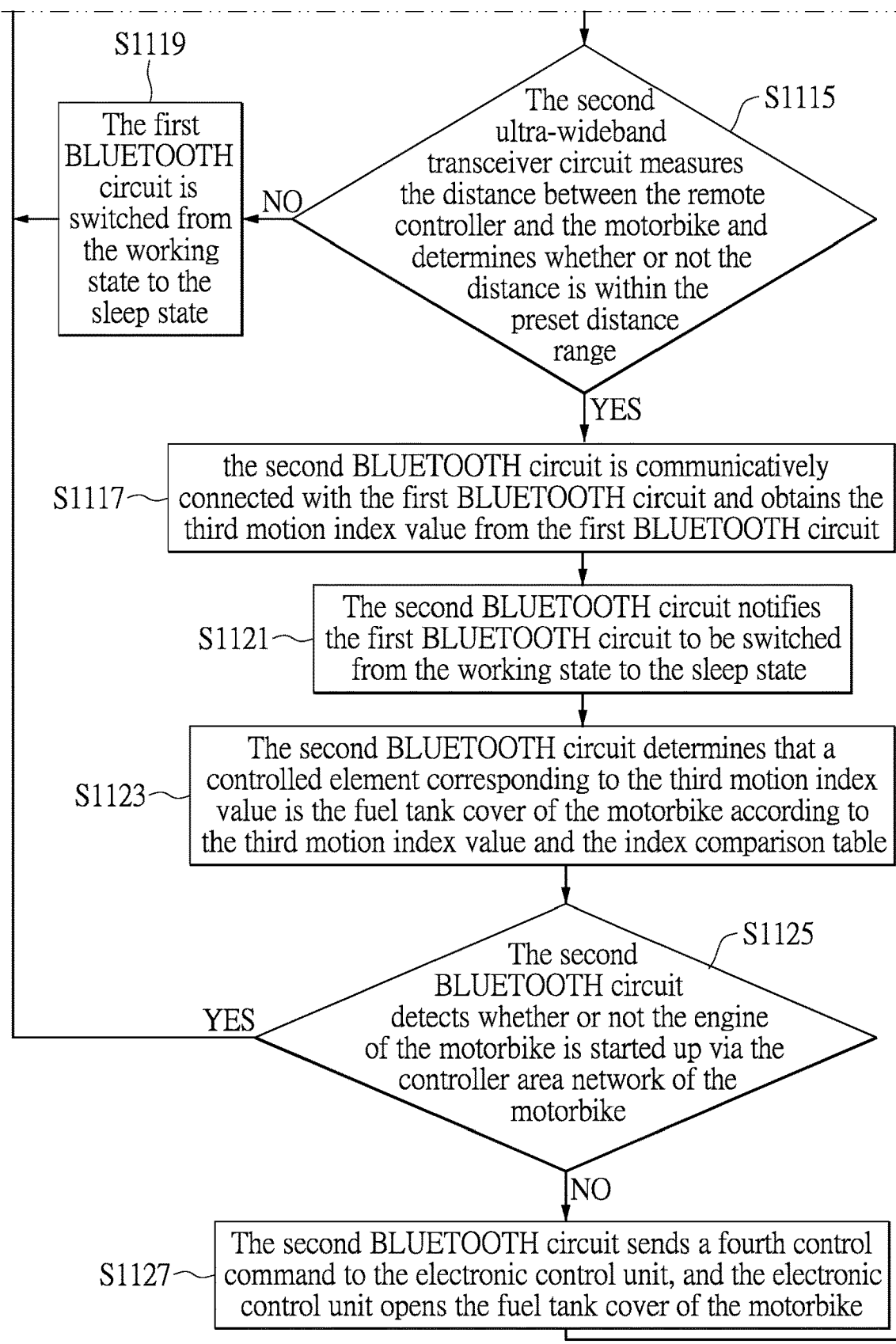

FIGS. 11A and 11B are flowcharts showing a control method of the remote-control system of FIG. 8 with respect to the fuel tank of the motorbike. As shown in FIGS. 11A and 11B, in step S1101, the remote controller KS2 receives an external force to generate a third motion. For example, when the user consecutively clicks on the surface of the remote controller KS2 three times, the remote controller KS2 generates the third motion.

In step S1103, the motion sensing circuit 12 detects the third motion of the remote controller KS2 and determines whether or not the third motion of the remote controller KS2 complies with one of the plurality of reference motions. When the third motion complies with one of the plurality of reference motions, the step S1103 is followed by step S1105. When the third motion does not comply with one of the plurality of reference motions, the step S1103 is followed by step S1107.

In the step S1105, the motion sensing circuit 12 is configured to have the first BLUETOOTH circuit 14 switched from the sleep state to the working state, and the first BLUETOOTH circuit 14 obtains a third motion index value corresponding to the third motion of the remote controller KS2 from the motion sensing circuit 12. In the step S1107, the first BLUETOOTH circuit 14 remains in the sleep state, and the control method of FIGS. 11A-11B returns to the step S1101.

The step S1105 is followed by step S1109. In the step S1109, the first BLUETOOTH circuit 14 or the second BLUETOOTH circuit 16 determines whether or not the received signal strength indication (RSSI) between the remote controller KS2 and the motorbike is greater than or equal to the strength threshold. The strength threshold can be, for example, −55 dB, but is not limited thereto. When the received signal strength indication (RSSI) is greater than or equal to the strength threshold, the step S1109 is followed by step S1111. When the received signal strength indication (RSSI) is less than the strength threshold, the step S1109 is followed by step S1113.

In the step S1111, the first BLUETOOTH circuit 14 and the second BLUETOOTH circuit 16 are configured to respectively have the first ultra-wideband transceiver circuit 18A and the second ultra-wideband transceiver circuit 18B switched from the sleep state to the working state. In the step S1113, the first BLUETOOTH circuit 14 is switched from the working state to the sleep state, and the control method of FIGS. 11A and 11B returns to the step S1101.

The step S1111 is followed by step S1115. In the step S1115, the second ultra-wideband transceiver circuit 18B measures the distance between the remote controller KS2 and the motorbike and determines whether or not the distance is within the preset distance range (for example, but not limited to, 0 cm to 100 cm).

When the distance between the remote controller KS2 and the motorbike is within the preset distance range, the step S1115 is followed by step S1117. When the distance between the remote controller KS2 and the motorbike is not within the preset distance range, the step S1115 is followed by step S1119.

In the step S1117, the second BLUETOOTH circuit 16 is communicatively connected with the first BLUETOOTH circuit 14 and obtains the third motion index value from the first BLUETOOTH circuit 14. In the step S1119, the first BLUETOOTH circuit 14 is switched from the working state to the sleep state, and the control method of FIGS. 11A and 11B returns to the step S1101.

The step S1117 is followed by step S1121. In the step S1121, the second BLUETOOTH circuit 16 notifies the first BLUETOOTH circuit 14 to be switched from the working state to the sleep state.

The step S1121 is followed by step S1123. In the step S1123, the second BLUETOOTH circuit 16 determines that a controlled element corresponding to the third motion index value is the fuel tank cover of the motorbike according to the third motion index value and the index comparison table.

The step S1123 is followed by step S1125. In the step S1125, the second BLUETOOTH circuit 16 detects whether or not the engine of the motorbike is started up via the controller area network (CAN bus) of the motorbike. When the engine of the motorbike is not started up, the step S1125 is followed by step S1127. When the engine of the motorbike is started up, the control method of FIGS. 11A and 11B returns to the step S1101 after the step S1125.

In the step S1127, the second BLUETOOTH circuit 16 sends a fourth control command to the electronic control unit (ECU), and the electronic control unit (ECU) opens the fuel tank cover of the motorbike.

The control method of FIGS. 11A and 11B returns to the step S1101 after the step S1127.

Figure 12:
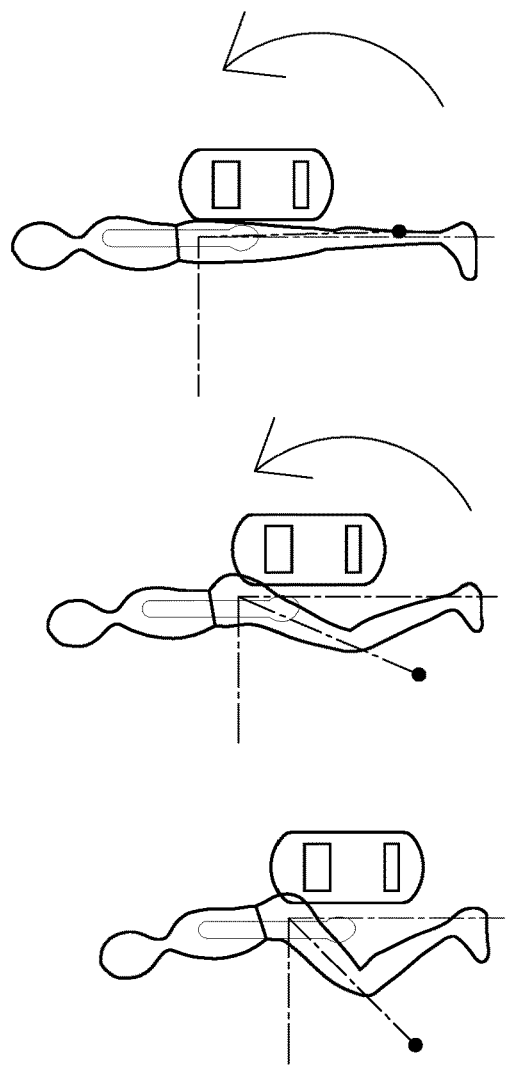
FIG. 12 is a schematic view showing motions of the remote controller for opening the seat cover of the motorbike.
Figure 12:
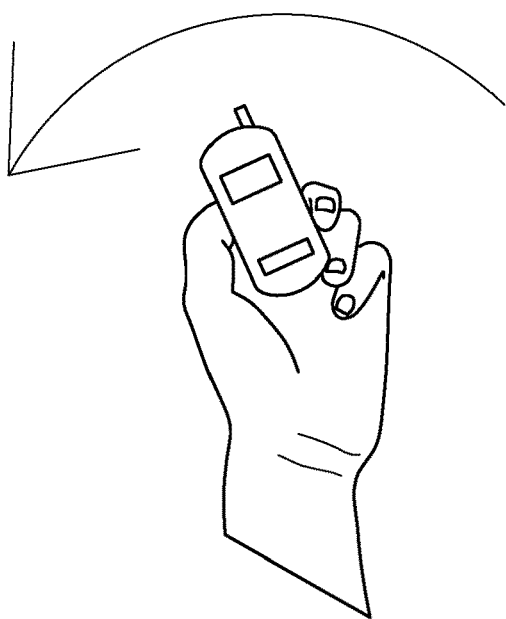

With respect to the control method of the remote-control system illustrated in FIGS. 3A and 3B and that illustrated in FIGS. 9A and 9B, a motion of the user clicking the remote controller once is preset as a designated motion for opening the seat cover of the motorbike. In fact, in addition to the motion of clicking the remote controller once, other motions can also be added as a designated motion for controlling the seat cover of the motorbike. FIG. 12 is a schematic view showing motions of the remote controller for opening the seat cover of the motorbike. For example, a motion in which the user holds and rotates the remote controller in an upward direction along an arc-shaped trajectory is preset as the designated motion for opening the seat cover of the motorbike. Alternatively, a motion in which the remote controller is placed in a pocket of the user and a posture of the user is changed from a squatting posture to a standing posture can also be preset as the designated motion for opening the seat cover of the motorbike. Therefore, the user has multiple ways to automatically open the seat cover of the motorbike, thereby enhancing the convenience of controlling the seat cover.

Figure 13:
FIG. 13 is a schematic view showing a motion of the remote controller for starting up the engine of the motorbike.
Figure 14:
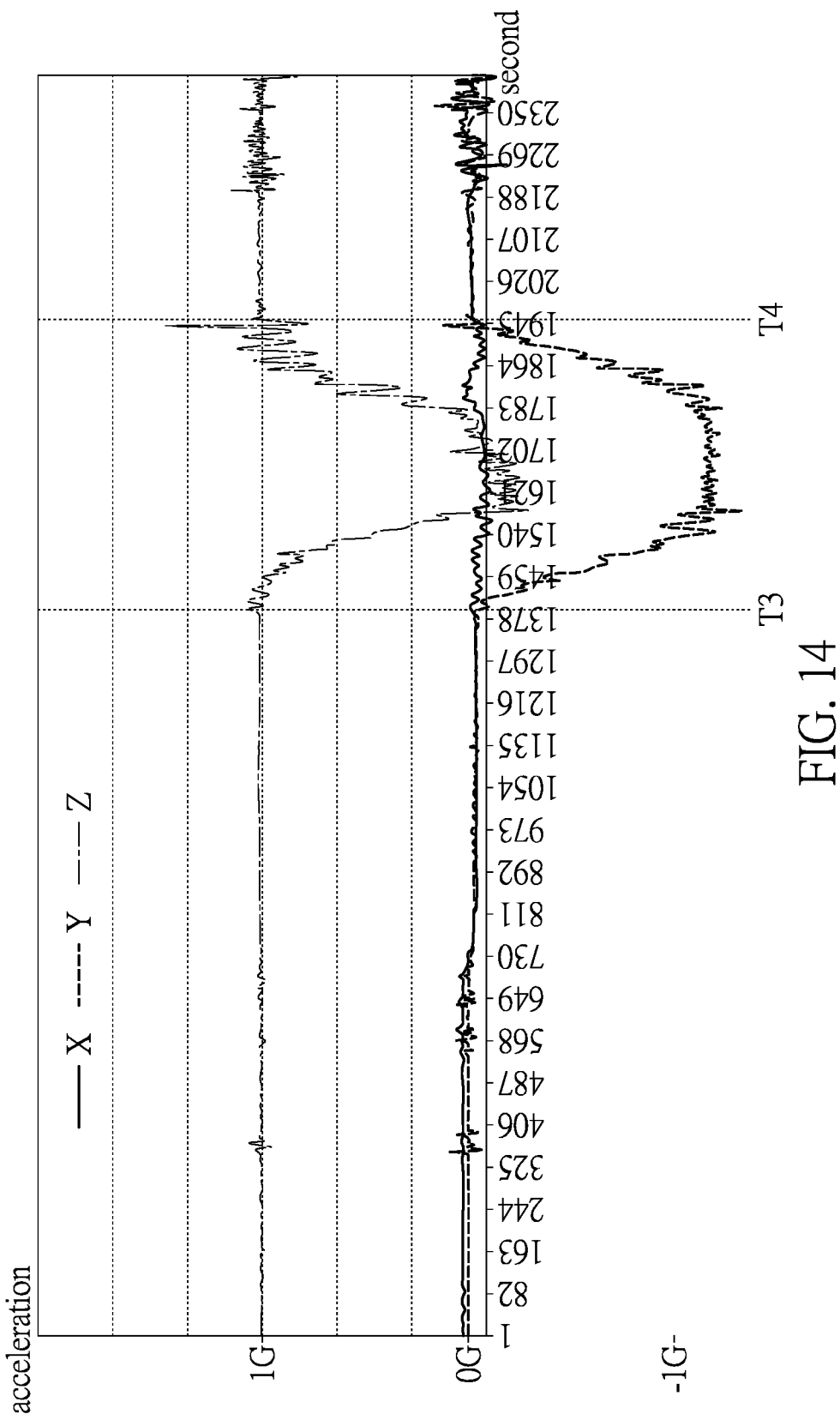
FIG. 14 is a schematic view showing an acceleration change of the motion of FIG. 13.
Figure 15:
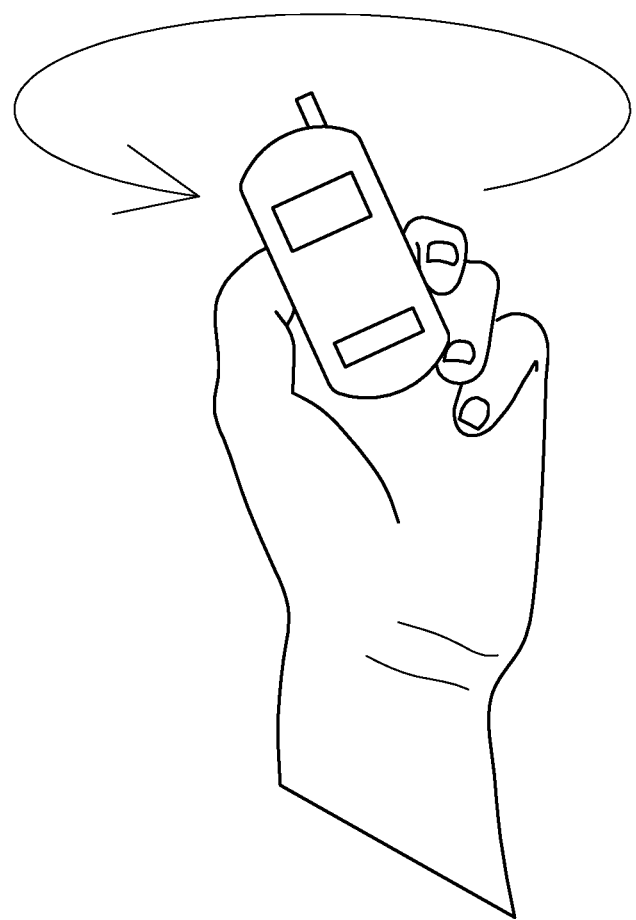
FIG. 15 is a schematic view showing a motion of the remote controller for turning off the engine of the motorbike.
Figure 16:
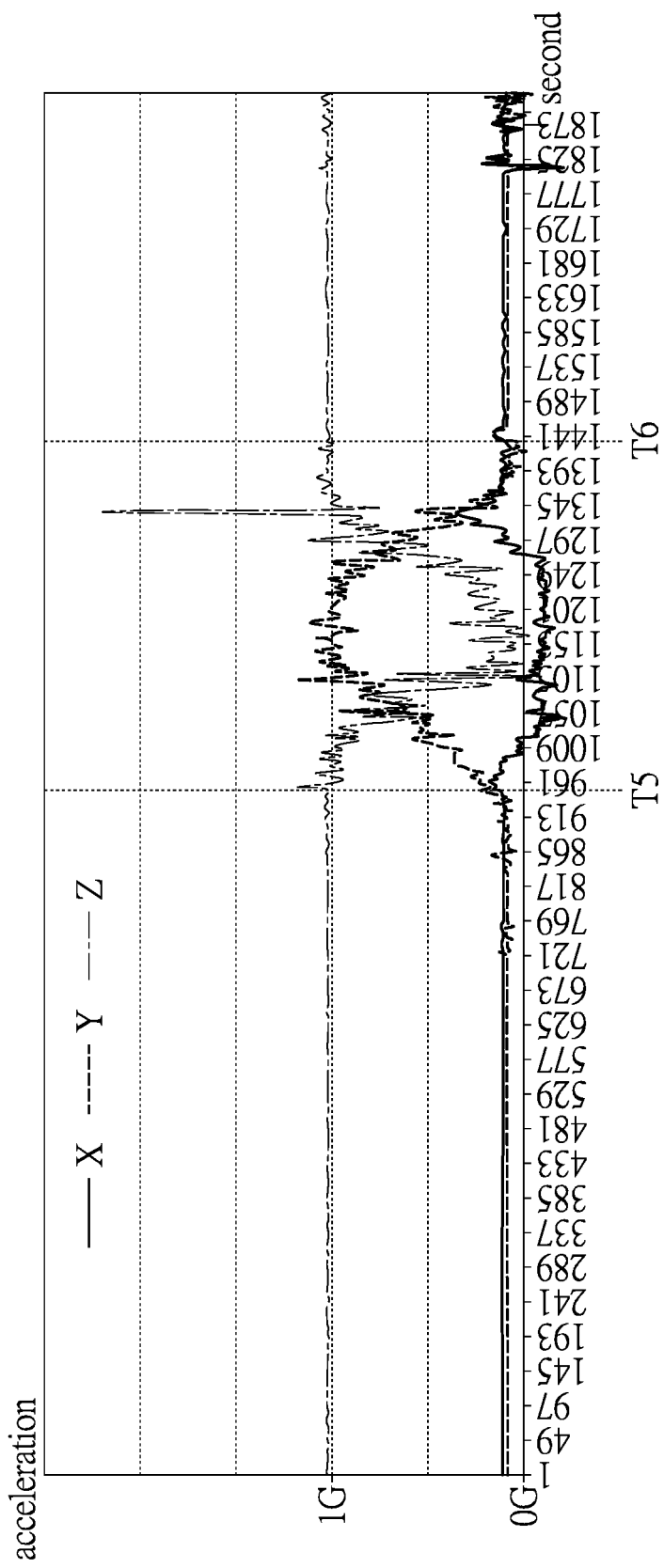
FIG. 16 is a schematic view showing an acceleration change of the motion of FIG. 15.

With respect to the control method of the remote-control system illustrated in FIGS. 5A and 5B and that illustrated in FIGS. 10A and 10B, a motion of the user clicking the remote controller twice is preset as a designated motion for starting up and turning off the engine of the motorbike. In fact, in addition to the motion of clicking the remote controller twice, other motions can also be added as the designated motion for starting up and turning off the engine of the motorbike. FIG. 13 is a schematic view showing a motion of the remote controller for starting up the engine of the motorbike. For example, a motion in which the user holds and rotates the remote controller along a clockwise trajectory is preset as the designated motion for starting up the engine of the motorbike. FIG. 14 is a schematic view showing an acceleration change of the motion of FIG. 13, in which an acceleration change between a third time point T3 and a fourth time point T4 represents an acceleration change of the remote controller being rotated along the clockwise trajectory. FIG. 15 is a schematic view showing a motion for turning off the engine of the motorbike. For example, a motion in which the user holds and rotates the remote controller along a counterclockwise trajectory is preset as the designated motion for turning off the engine of the motorbike. FIG. 16 is a schematic view showing an acceleration change of the motion of FIG. 15, in which an acceleration change between a fifth time T5 and a sixth time point T6 represents an acceleration change of the remote controller being rotated along the counterclockwise trajectory.

In this way, the user has various ways to start up and turn off the engine of the motorbike, thereby enhancing the convenience of controlling the engine of the motorbike.

Figure 17:
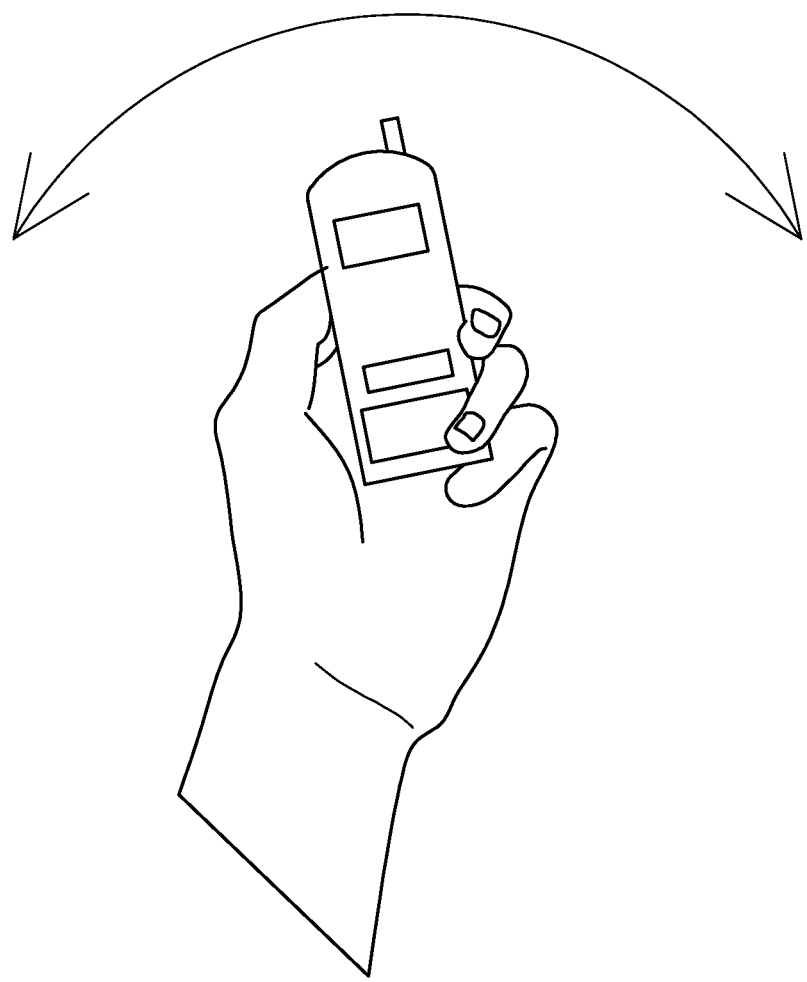
FIG. 17 is a schematic view showing a motion of the remote controller for opening the fuel tank cover of the motorbike.

With respect to the control method of the remote-control system illustrated in FIGS. 6A and 6B and that illustrated in FIGS. 11A and 11B, a motion of the user clicking the remote controller three times is preset as a designated motion for opening the fuel tank cover of the motorbike. In fact, in addition to the motion of clicking the remote controller three times, other motions can also be added as the designated motion for opening the fuel tank cover of the motorbike. FIG. 17 is a schematic view showing a motion for opening the fuel tank cover of the motorbike. For example, a motion in which the user holds and repeatedly shakes the remote controller from left to right side is preset as the designated motion for opening the fuel tank cover of the motorbike. Therefore, the user has multiple ways to open the fuel tank cover of the motorbike, thereby enhancing the convenience of controlling the fuel tank cover.

The control methods of the remote-control systems illustrated in FIGS. 3A and 3B, FIGS. 5A and 5B, FIGS. 6A and 6B, FIGS. 9A and 9B, FIGS. 10A and 10B, FIGS. 11A and 11B, FIG. 12, FIG. 13, FIG. 15 and FIG. 17 are only examples for the motorbike. In fact, the control method of the remote-control system provided in the present disclosure is not limited to controlling of the motorbike, but can also be applied to other vehicle types or a multimedia audio-visual device. For example, the controlled device can be a television (TV). When the television is in an off state, the user can click the remote controller once to turn on power of the television. When the television is in an on state, the user can click the remote controller once to turn off the power of the television. When the television is in the on state, the user can hold and continuously rotate the remote controller along a clockwise trajectory, so as to increase a volume of the television. When the television is in the on state, the user can also hold and continuously rotate the remote controller along a counterclockwise trajectory, so as to decrease the volume of the television. When the television is in the on state, the user can hold and shake the remote controller from left to right, so as to adjust channels of the television in an upward sequence. When the television is in the on state, the user can also hold and shake the remote controller from right to left, so as to adjust the channels of the television in a downward sequence.

Beneficial Effects of the Embodiments

In conclusion, the remote controller, the remote-control system and the control method of the remote-control system provided by the present disclosure can be applied to various consumer electronic s and vehicles. The BLUETOOTH circuit of the remote controller is normally in the sleep state. Only when a motion of the remote controller that is generated by receipt of an external force complies with one of multiple preset reference motions, the BLUETOOTH circuit is switched from the sleep state to the working state. Therefore, even if the user accidentally applies an external force to the remote controller, the BLUETOOTH circuit will not be easily activated. In this way, power of the remote controller can be saved. In addition, the received signal strength indication (RSSI) between the remote controller and the controlled device may be interfered by surrounding electromagnetic waves, such that the remote controller continues to send control commands to the controlled device even when the remote controller is far away from the controlled device. For example, the engine of the motorbike is started up by the remote controller before a rider is in a vicinity of the motorbike. Since the ultra-wideband transceiver circuit can measure a distance with high precision, and an error of the measured distance is within a range from −10 cm to 10 cm, the remote controller sends a control command to the motorbike only when the rider is near the motorbike. Due to the ultra-wideband transceiver circuit, the probability of wrong operation of the motorbike can be decreased, and the rider can control the motorbike in a more convenient and practical manner.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A remote-control system, comprising:
a remote controller including a motion sensing circuit and a first wireless communication circuit electrically connected to the motion sensing circuit, wherein the motion sensing circuit determines whether or not a motion of the remote controller complies with one of a plurality of reference motions; and
a second wireless communication circuit configured to be disposed in a controlled device;
wherein, when the motion of the remote controller complies with one of the plurality of reference motions, the first wireless communication circuit is switched from a sleep state to a working state;
wherein the first wireless communication circuit or the second wireless communication circuit determines whether or not a received signal strength indication (RSSI) between the remote controller and the controlled device is greater than or equal to a strength threshold;

wherein, when the received signal strength indication is smaller than the strength threshold, the remote controller is switched from the working state to the sleep state.

2. The remote-control system according to claim 1, wherein, when the received signal strength indication is greater than or equal to the strength threshold, the second wireless communication circuit detects an operational state of the controlled device and sends a control command to the controlled device according to the operational state and the motion of the remote controller.

3. The remote-control system according to claim 2, further comprising a first ultra-wideband transceiver and a second ultra-wideband transceiver, wherein the first wireless communication circuit is a first BLUETOOTH circuit, the first ultra-wideband transceiver is electrically connected to the first BLUETOOTH circuit, the second wireless communication circuit is a second BLUETOOTH circuit, and the second ultra-wideband transceiver is electrically connected to the second BLUETOOTH circuit; wherein, when the received signal strength indication is greater than or equal to the strength threshold, the first BLUETOOTH circuit is configured to have the first ultra-wideband transceiver switched from a sleep state to a working state, and the second BLUETOOTH circuit is configured to have the second ultra-wideband transceiver switched from a sleep state to a working state; wherein the second ultra-wideband transceiver that is in the working state measures a distance between the remote controller and the controlled device, and determines whether or not the distance is within a preset distance range; wherein, when the distance is within the preset distance range, the second BLUETOOTH circuit detects the operational state of the controlled device and sends the control command to the controlled device according to the operational state of the controlled device and the motion of the remote controller; wherein, when the distance is not within the preset distance range, the first BLUETOOTH circuit is switched from a working state to a sleep state.

4. A control method of a remote-control system, comprising:
   determining, by a motion sensing circuit of a remote controller, whether or not a motion of the remote controller complies with one of a plurality of reference motions;
   switching a first wireless communication circuit of the remote controller from a sleep state to a working state when the motion of the remote controller complies with one of the plurality of reference motions;
   determining, by the first wireless communication circuit that is in the working state or a second wireless communication circuit of a controlled device, whether or not a received signal strength indication between the remote controller and the controlled device is greater than or equal to a strength threshold; and
   switching the first wireless communication circuit from the working state to the sleep state when the received signal strength indication is smaller than the strength threshold.

5. The control method of the remote-control system according to claim 4, further comprising:
   communicatively connecting the second wireless communication circuit with the first wireless communication circuit when the received signal strength indication is greater than or equal to the strength threshold;
   detecting, by the second wireless communication circuit, an operational state of the controlled device; and
   sending, by the second wireless communication circuit, a control command to the controlled device according to the operational state of the controlled device and the motion of the remote controller.

6. The control method of the remote-control system according to claim 5, further comprising: obtaining, by the second wireless communication circuit, a motion index value corresponding to the motion of the remote controller from the first wireless communication circuit after the second wireless communication circuit is communicatively connected with the first wireless communication circuit and before the second wireless communication circuit detects the operational state of the controlled device; and generating, by the second wireless communication circuit, the control command according to the motion index value obtained from the first wireless communication circuit and an index comparison table saved in the second wireless communication circuit.

7. The control method of the remote-control system according to claim 4, further comprising: switching, by the first wireless communication circuit, a first ultra-wideband transceiver of the remote controller from a sleep state to a working state when the received signal strength indication is greater than or equal to the strength threshold; switching, by the second wireless communication circuit, a second ultra-wideband transceiver of the controlled device from a sleep state to a working state when the received signal strength indication is greater than or equal to the strength threshold; measuring, by the second ultra-wideband transceiver that is in the working state, a distance between the remote controller and the controlled device; determining, by the second ultra-wideband transceiver that is in the working state, whether or not the distance is within a preset distance range; and detecting, by the second wireless communication circuit, the operational state of the controlled device when the distance is within the preset distance range.

8. The control method of the remote-control system according to claim 4, wherein the controlled device is a motorbike, the motion of the remote controller is a first motion, and the first motion complies with one of the reference motions; wherein the second wireless communication circuit detects whether or not a speed of the motorbike is zero, and an electronic control unit of the motorbike opens a seat cover of the motorbike according to the control command when the speed is zero.

9. The control method of the remote-control system according to claim 4, wherein the controlled device is a motorbike, the motion of the remote controller is a second motion, and the second motion complies with one of the reference motions; wherein the second wireless communication circuit detects whether or not an engine of the motorbike is started up, and an electronic control unit of the motorbike starts up the engine when the engine is not started up.

10. The control method of the remote-control system according to claim 9, wherein, when the engine is started up, the second wireless communication circuit detects whether or not a speed of the motorbike is zero; wherein, when the speed is zero, the electronic control unit turns off the engine.

11. The control method of the remote-control system according to claim 4, wherein the controlled device is a motorbike, the motion of the remote controller is a third motion, and the third motion complies with one of the reference motions; wherein the second wireless communication circuit detects whether or not an engine of the motorbike is started up, and an electronic control unit of the motorbike opens a fuel tank cover of the motorbike when the engine is not started up.

\* \* \* \* \*